(12) United States Patent
Ge et al.

(10) Patent No.: US 11,805,406 B2
(45) Date of Patent: Oct. 31, 2023

(54) TERMINAL IDENTIFICATION METHOD AND APPARATUS

(71) Applicant: HUAWEI TECHNOLOGIES CO., LTD., Guangdong (CN)

(72) Inventors: Cuili Ge, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 17/343,891

(22) Filed: Jun. 10, 2021

(65) Prior Publication Data
US 2021/0306845 A1 Sep. 30, 2021

Related U.S. Application Data

(63) Continuation of application No. PCT/CN2019/124112, filed on Dec. 9, 2019.

(30) Foreign Application Priority Data

Dec. 13, 2018 (CN) .......................... 201811528068.1

(51) Int. Cl.
*H04W 4/00* (2018.01)
*H04W 8/28* (2009.01)
*H04W 4/021* (2018.01)
*H04W 8/12* (2009.01)
(Continued)

(52) U.S. Cl.
CPC ............. *H04W 8/28* (2013.01); *H04W 4/021* (2013.01); *H04W 8/12* (2013.01); *H04W 64/003* (2013.01); *H04W 84/06* (2013.01)

(58) Field of Classification Search
CPC ......... H04W 8/28; H04W 4/021; H04W 8/12; H04W 64/003
See application file for complete search history.

(56) References Cited

U.S. PATENT DOCUMENTS

2016/0373890 A1 12/2016 Chang et al.
2021/0083761 A1* 3/2021 Hong .................... H04W 36/08
(Continued)

FOREIGN PATENT DOCUMENTS

| CN | 104144434 A | 11/2014 |
| CN | 108064465 A | 5/2018 |
| CN | 108702638 A | 10/2018 |

(Continued)

OTHER PUBLICATIONS

3GPP TR 22.825 V16.0.0 (Sep. 2018), "3rd Generation Partnership Project; Technical Specification Group Services and System Aspects; Remote Identification of Unmanned Aerial Systems; Stage 1 (Release 16)," Sep. 2018, 22 pages.

(Continued)

*Primary Examiner* — Justin Y Lee
(74) *Attorney, Agent, or Firm* — Fish & Richardson P.C.

(57) ABSTRACT

Examples in this application provide terminal identification methods and apparatus. One example method includes a first mobility management entity receiving a first request and sending, to an application server, a first response to the first request based on the first request. The first request is used to request to identify a first-type terminal, and the first response is used to indicate that the first-type terminal is identified.

20 Claims, 7 Drawing Sheets

(51) Int. Cl.
*H04W 64/00* (2009.01)
*H04W 84/06* (2009.01)

(56) References Cited

U.S. PATENT DOCUMENTS

2021/0092590 A1   3/2021   Hong
2021/0099969 A1*  4/2021   Poscher ............... G01S 19/396

FOREIGN PATENT DOCUMENTS

CN      108781363 A      11/2018
WO      2018204623 A1    11/2018

OTHER PUBLICATIONS

Extended European Search Report in European Application No. 19896455.3, dated Aug. 20, 2021, 8 pages.
3GPP TS 23.167 V15.3.0 (Sep. 2018), "3rd Generation Partnership Project; Technical Specification Group Services and System Aspects; IP Multimedia Subsystem (IMS) emergency sessions(Release 15)," Sep. 2018, 63 pages.
3GGPP TS 23.271 V15.1.0 (Sep. 2018), "3rd Generation Partnership Project; Technical Specification Group Services and System Aspects; Functional stage 2 description of Location Services (LCS)(Release 15)," Sep. 2018, 184 pages.
3GPP TS 23.501 V15.3.0 (Sep. 2018), "3rd Generation Partnership Project; Technical Specification Group Services and System Aspects; System Architecture for the 5G System; Stage 2(Release 15)," Sep. 2018, 226 pages.
3GPP TS 23.502 V15.3.0 (Sep. 2018), "3rd Generation Partnership Project; Technical Specification Group Services and System Aspects; Procedures for the 5G System;Stage 2(Release 15)," Sep. 2018, 329 pages.
3GPP TS 24.008 V15.4.0 (Sep. 2018), "3rd Generation Partnership Project; Technical Specification Group Core Network and Terminals; Mobile radio interface Layer 3 specification; Core network protocols; Stage 3(Release 15)," Sep. 2018, 790 pages.
3GPP TS 25.305 V15.0.0 (Jun. 2018), "3rd Generation Partnership Project; Technical Specification Group Radio Access Network; Stage 2 functional specification of User Equipment (UE) positioning in UTRAN(Release 15)," Jun. 2018, 95 pages.
3GPP TS 36.355 V15.1.0 (Sep. 2018), "3rd Generation Partnership Project; Technical Specification Group Radio Access Network; Evolved Universal Terrestrial Radio Access (E-UTRA); Lte Positioning Protocol (LPP)(Release 15)," Sep. 2018, 217 pages.
3GPP TS 38.455 V15.1.0 (Sep. 2018), "3rd Generation Partnership Project; Technical Specification Group Radio Access Network; NG-RAN; NR Positioning Protocol A (NRPPa) (Release 15)," Sep. 2018, 60 pages.
3Gpp TS 43.059 V15.1.0 (Jun. 2018), "3rd Generation Partnership Project; Technical Specification Group Radio Access Network; Functional stage 2 description of Location Services (LCS) in GERAN(Release 15)," Jun. 2018, 83 pages.
Office Action issued in Chinese Application No. 201811528068.1 dated Nov. 13, 2020, 15 pages (with English translation).
PCT International Search Report and Written Opinion issued in International Application No. PCT/CN2019/124112 dated Mar. 9, 2020, 13 pages (with English translation).
Orange, "New use case for detection and management of a rogue UAS," 3GPP TSG-SA WG1 Meeting #83, S1-182092, West Palm Beach, Florida, US, Aug. 20-24, 2018, 2 pages.
Huawei, "ID_UAS—Use case of UAV type identification," 3GPP TSG-SA WG1 Meeting #83, S1-182732, West Palm Beach, Aug. 20-24, 2018, 2 pages.
Office Action in Chinese Application No. 201811528068.1, dated Sep. 3, 2021, 6 pages.

* cited by examiner

TERMINAL IDENTIFICATION METHOD AND APPARATUS

CROSS-REFERENCE TO RELATED APPLICATIONS

This application is a continuation of International Application No. PCT/CN2019/124112, filed on Dec. 9, 2019, which claims priority to Chinese Patent Application No. 201811528068.1, filed on Dec. 13, 2018. The disclosures of the aforementioned applications are hereby incorporated by reference in their entireties.

TECHNICAL FIELD

This application relates to the field of communication technologies, and in particular, to a terminal identification method and an apparatus.

BACKGROUND

Currently, an unmanned aerial vehicle (UAV for short) can be conveniently supervised when being identified and supervised. Supervision of the unmanned aerial vehicle may be implemented through real-name registration. That is, for unmanned aerial vehicles with a weight of more than 250 grams in China, holders of the unmanned aerial vehicles need to be registered in real name. However, the general public generally have a weak awareness of law. Real-name registration is often a mere formality and the unmanned aerial vehicles cannot be well supervised.

SUMMARY

Embodiments of this application provide a terminal identification method and an apparatus. According to the method, an unmanned aerial vehicle can be identified based on a cellular technology, thereby improving supervision efficiency of the unmanned aerial vehicle.

To achieve the foregoing objective, the embodiments of this application provide the following methods and communication apparatuses described in the first part and the second part:

First Part:

The first part provides terminal identification methods, which specifically include the following methods provided in any one or more of the first aspect to the third aspect, and further provides communication apparatuses, which are specifically any one or more communication apparatuses provided in the fourth aspect to the sixth aspect. The communication apparatuses provided in the fourth aspect to the sixth aspect are respectively configured to implement the methods provided in the first aspect to the third aspect.

According to a first aspect, a terminal identification method is provided. The terminal identification method includes: A first mobility management entity receives a first request, and sends a response to the first request to an application server based on the first request, where the first request is used to request to identify a first-type terminal, and the response to the first request is used to indicate that the first-type terminal is identified. According to the method provided in the first aspect, when the first-type terminal is an unmanned aerial vehicle, the mobility management entity may identify the unmanned aerial vehicle based on the received first request, and feed back, to a USS, whether the unmanned aerial vehicle is identified. The USS identifies the unmanned aerial vehicle by using a communication network, so that the unmanned aerial vehicle can be conveniently and quickly supervised.

With reference to the first aspect, in a first possible implementation, the response to the first request includes an identifier of a first terminal and/or first indication information, a type of the first terminal is the first type, and the first indication information is used to indicate that the first-type terminal is identified. In this possible implementation, two manners of indicating, to the application server, that the first-type terminal is identified are provided for the first mobility management entity. That is, the identifier of the identified terminal (that is, the first terminal) or the first indication information is used for indication.

With reference to the first possible implementation of the first aspect, in a second possible implementation, the first request includes area information of a first area, the area information is used to indicate the first area, and the first request is specifically used to request to identify the first-type terminal in the first area; and the first terminal is located in the first area, or the first indication information is specifically used to indicate that the first-type terminal is identified in the first area. In this possible implementation, when the first-type terminal is an unmanned aerial vehicle, the mobility management entity may identify the unmanned aerial vehicle in the first area based on the received first request, and feed back, to the USS, whether the unmanned aerial vehicle is identified in the first area. The USS identifies the unmanned aerial vehicle in an area/some areas by using the communication network, so that the unmanned aerial vehicle can be conveniently and quickly supervised.

With reference to the first possible implementation or the second possible implementation of the first aspect, in a third possible implementation, the response to the first request includes the first indication information, and the method further includes: The first mobility management entity receives a second request; and sends a response to the second request to the application server based on the second request, where the second request is used to request to position the identified first-type terminal, and the response to the second request includes an identifier of a second terminal and location information of the second terminal, and a type of the second terminal is the first type. In this possible implementation, when the first-type terminal is an unmanned aerial vehicle, the mobility management entity may position the unmanned aerial vehicle based on the received second request, feed back location information of the unmanned aerial vehicle to the USS, and position the unmanned aerial vehicle by using the communication network. This helps the USS determine a location of the unmanned aerial vehicle, and supervise the unmanned aerial vehicle.

With reference to the third possible implementation of the first aspect, in a fourth possible implementation, when the first request includes the area information of the first area, the second request includes the area information of the first area, the second request is specifically used to request to position the first-type terminal identified in the first area, and the second terminal is located in the first area. In this possible implementation, when the first-type terminal is an unmanned aerial vehicle, the mobility management entity may position the unmanned aerial vehicle in the first area based on the received second request, feed back location information of the unmanned aerial vehicle in the first area to the USS, and position the unmanned aerial vehicle in an area/some areas by using the communication network. This helps the USS determine a location of the unmanned aerial vehicle in the area/some areas, and supervise the unmanned aerial vehicle.

With reference to any one of the second possible implementation to the fourth possible implementation of the first aspect, in a fifth possible implementation, the second request further includes information used to indicate the first type.

With reference to the first possible implementation or the second possible implementation of the first aspect, in a sixth possible implementation, the response to the first request includes the identifier of the first terminal and location information of the first terminal, and the method further includes: The first mobility management entity positions the identified first-type terminal based on the first request. In this possible implementation, when the first-type terminal is an unmanned aerial vehicle, the mobility management entity may identify and position the unmanned aerial vehicle based on the received first request, and feed back an identifier and location information of the unmanned aerial vehicle to the USS. This helps the USS determine a location of the unmanned aerial vehicle, and reduce signaling overheads between the USS and the mobility management entity.

With reference to the first possible implementation or the second possible implementation of the first aspect, in a seventh possible implementation, the response to the first request includes the identifier of the first terminal, and the method further includes: The first mobility management entity receives a third request, and sends a response to the third request to the application server based on the third request, where the third request is used to request to position the first terminal, and the response to the third request includes location information of the first terminal. In this possible implementation, when the first-type terminal is an unmanned aerial vehicle, the mobility management entity may position a specific unmanned aerial vehicle based on the received third request, and feed back location information of the specific unmanned aerial vehicle to the USS. This helps the USS supervise the specific unmanned aerial vehicle.

With reference to any one of the first aspect, or the first possible implementation to the seventh possible implementation of the first aspect, in an eighth possible implementation, the first type is an unmanned aerial vehicle.

With reference to any one of the first aspect, or the first possible implementation to the eighth possible implementation of the first aspect, in a ninth possible implementation, the first request further includes the information used to indicate the first type.

According to a second aspect, a terminal identification method is provided. The terminal identification method includes: An application server sends a first request, and receives a response to the first request, where the first request is used to request to identify a first-type terminal, and the response to the first request is used to indicate that the first-type terminal is identified. According to the method provided in the second aspect, the application server may obtain information about whether there is an unmanned aerial vehicle by sending the first request and receiving the response to the first request, and a USS identifies an unmanned aerial vehicle by using a communication network, so that the unmanned aerial vehicle can be conveniently and quickly supervised.

With reference to the second aspect, in a first possible implementation, the response to the first request includes an identifier of a first terminal and/or first indication information, a type of the first terminal is the first type, and the first indication information is used to indicate that the first-type terminal is identified. In this possible implementation, two manners of determining that there is an unmanned aerial vehicle are provided for the application server. That is, the identifier of the first terminal or the first indication information are used to determine that there is an unmanned aerial vehicle.

With reference to the first possible implementation of the second aspect, in a second possible implementation, the first request includes area information of a first area, the area information is used to indicate the first area, and the first request is specifically used to request to identify the first-type terminal in the first area; and the first indication information is specifically, used to indicate that the first-type terminal is identified in the first area, or that the first terminal is located in the first area. In this possible implementation, the application server may obtain information about whether there is an unmanned aerial vehicle in the first area by sending the first request and receiving the response to the first request. The USS identifies an unmanned aerial vehicle in an area/some areas by using the communication network, so that the unmanned aerial vehicle in the area/some areas can be conveniently and quickly supervised.

With reference to the first possible implementation or the second possible implementation of the second aspect, in a third possible implementation, the response to the first request includes the first indication information, and the method further includes: The application server sends a second request based on the response to the first request, where the second request is used to request to position the identified first-type terminal; and the application server receives a response to the second request, where the response to the second request includes an identifier of a second terminal and location information of the second terminal, and a type of the second terminal is the first type. In this possible implementation, the application server may obtain location information of an unmanned aerial vehicle by sending the second request and receiving the response to the second request, to supervise a location of the unmanned aerial vehicle.

With reference to the third possible implementation of the second aspect, in a fourth possible implementation, when the first request includes the area information of the first area, the second request includes the area information of the first area, the second request is specifically used to request to position the first-type terminal identified in the first area, and the second terminal is located in the first area. In this possible implementation, the application server may obtain location information of an unmanned aerial vehicle in the first area by sending the second request and receiving the response to the second request, to supervise a location of the unmanned aerial vehicle in the first area.

With reference to any one of the second possible implementation to the fourth possible implementation of the second aspect, in a fifth possible implementation, the second request further includes information used to indicate the first type.

With reference to the first possible implementation or the second possible implementation of the second aspect, in a sixth possible implementation, the response to the first request includes the identifier of the first terminal and location information of the first terminal.

With reference to the first possible implementation or the second possible implementation of the second aspect, in a seventh possible implementation, the response to the first request includes the identifier of the first terminal, and the method further includes: The application server sends a third request based on the response to the first request, where the third request is used to request to position the first terminal; and the application server receives a response to the third request, where the response to the third request includes location information of the first terminal, in this possible implementation, the application server may obtain location information of a specific unmanned aerial vehicle by sending the third request and receiving the response to the third request, to supervise a location of the specific unmanned aerial vehicle.

With reference to any one of the second aspect, or the first possible implementation to the seventh possible implementation of the second aspect, in an eighth possible implementation, that an application server sends a first request includes: The application server sends the first request to a border control network element; or the application server sends the first request to a first mobility management entity. In this possible implementation, two manners of sending the first request are provided for the application server.

With reference to any one of the second aspect, or the first possible implementation to the eighth possible implementation of the second aspect, in a ninth possible implementation, the first type is an unmanned aerial vehicle.

With reference to any one of the second aspect, or the first possible implementation to the ninth possible implementation of the second aspect, in a tenth possible implementation, the first request includes the information used to indicate the first type.

According to a third aspect, a terminal identification method is provided. The terminal identification method includes: A border control network element receives a first request from an application server, where the first request is used to request to identify a first-type terminal; the border control network element determines a first mobility management entity based on the first request, and the border control network element sends the first request to the first mobility management entity. According to the method provided in the third aspect, the border control network element may send the first request to the determined first mobility management entity, so that the first mobility management entity identifies the first-type terminal.

With reference to the third aspect, in a first possible implementation, the first request includes information used to indicate the first type.

With reference to the third aspect or the first possible implementation of the third aspect, in a second possible implementation, the first request includes area information of a first area, the area information is used to indicate the first area, and the first request is specifically used to request to identify the first-type terminal in the first area. In this possible implementation, the border control network element may send the first request to the determined first mobility management entity, so that the first mobility management entity identifies the first-type terminal in the first area.

With reference to the third aspect, or the first possible implementation or the second possible implementation of the third aspect, in a third possible implementation, that the border control network element determines a first mobility management entity based on the first request includes: The border control network element sends a fifth request to a unified data management entity based on the first request, where the fifth request is used to request a mobility management entity serving the first-type terminal, and the fifth request includes the information used to indicate the first type; the border control network element receives a response to the fifth request from the unified data management entity, where the response to the fifth request includes second indication information, and the second indication information is used to indicate the mobility management entity serving the first-type terminal; and the border control network element determines the first mobility management entity based on the second indication information. In this possible implementation, a manner of determining the first mobility management entity is provided for the border control network element.

With reference to the third possible implementation of the third aspect, in a fourth possible implementation, the fifth request further includes third indication information, and the third indication information is used to indicate that a type of a requested network function is a mobility management function.

With reference to the fourth possible implementation of the third aspect, in a fifth possible implementation, when the first request includes the area information of the first area, the method further includes: The border control network element sends a sixth request to a network function repository function entity based on the first request, where the sixth request is used to request a mobility management entity in the first area, and the sixth request includes the area information of the first area; the border control network element receives a response to the sixth request from the network function repository function entity, where the response to the sixth request includes fourth indication information, and the fourth indication information is used to indicate the mobility management entity in the first area; and that the border control network element determines the first mobility management entity based on the second indication information includes: The border control network element determines the first mobility management entity based on the second indication information and the fourth indication information. In this possible implementation, a method for determining the first mobility management entity based on the first area is provided for the border control network element.

With reference to any one of the third aspect, or the first possible implementation or the fifth possible implementation of the third aspect, in a sixth possible implementation, the first type is an unmanned aerial vehicle.

According to a fourth aspect, a communication apparatus is provided. The communication apparatus has functions of implementing the method provided in the first aspect. The functions may be implemented by hardware, or may be implemented by hardware by executing corresponding software. The hardware or the software includes one or more units corresponding to the foregoing functions. The communication apparatus may exist in a product form of a chip.

According to a fifth aspect, a communication apparatus is provided. The communication apparatus leas functions of implementing the method provided in the second aspect. The functions may be implemented by hardware, or may be implemented by hardware by executing corresponding software. The hardware or the software includes one or more units corresponding to the foregoing functions. The communication apparatus may exist in a product form of a chip.

According to a sixth aspect, a communication apparatus is provided. The communication apparatus includes a communication unit and a processing unit. The communication unit is configured to receive a first request from an application server, where the first request is used to request to identify a first-type terminal. The processing unit is configured to determine a first mobility management entity based on the first request. The communication unit is further configured to send the first request to the first mobility management entity.

With reference to the sixth aspect, in a first possible implementation, the first request includes information used to indicate the first type.

With reference to the sixth aspect or the first possible implementation of the sixth aspect, in a second possible implementation, the first request includes area information of a first area, the area information is used to indicate the first area, and the first request is specifically used to request to identify the first-type terminal in the first area.

With reference to the sixth aspect, or the first possible implementation or the second possible implementation of the sixth aspect, in a third possible implementation, the processing unit is specifically configured to: send a fifth request to a unified data management entity by using the communication unit based on the first request, where the fifth request is used to request a mobility, management entity serving the first-type terminal, and the fifth request includes the information used to indicate the first type; receive a response to the fifth request from the unified data management entity by using the communication unit, where the response to the fifth request includes second indication information, and the second indication information is used to indicate the mobility management entity serving the first-type terminal; and determine the first mobility management entity based on the second indication information.

With reference to the third possible implementation of the sixth aspect, in a fourth possible implementation, the fifth request further includes third indication information, and the third indication information is used to indicate that a type of a requested network function is a mobility management function.

With reference to the fourth possible implementation of the sixth aspect, in a fifth possible implementation, when the first request includes the area information of the first area, the processing unit is further configured to send a sixth request to a network function repository function entity by using the communication unit based on the first request, where the sixth request is used to request a mobility management entity in the first area, and the sixth request includes the area information of the first area; the communication unit is further configured to receive a response to the sixth request from the network function repository function entity, where the response to the sixth request includes fourth indication information, and the fourth indication information is used to indicate the mobility management entity in the first area; and the processing unit is specifically configured to determine the first mobility management entity based on the second indication information and the fourth indication information.

With reference to any one of the sixth aspect, or the first possible implementation or the fifth possible implementation of the sixth aspect, in a sixth possible implementation, the first type is an unmanned aerial vehicle.

Second Part:

The second part provides terminal positioning methods, which include the following methods provided in any one or more of the seventh aspect to the ninth aspect, and further provides communication apparatuses, which are specifically any one or more communication apparatuses provided in the tenth aspect to the twelfth aspect. The communication apparatuses provided in the tenth aspect to the twelfth aspect are respectively configured to implement the methods provided in the seventh aspect to the ninth aspect.

According to a seventh aspect, a terminal positioning method is provided. The terminal positioning method includes: A second mobility management entity receives a fourth request, where the fourth request is used to request to position a first-type terminal; the second mobility management entity positions a third terminal based on the fourth request, where the third terminal is the first-type terminal; and the second mobility management entity sends a response to the fourth request to an application server, where the response to the fourth request includes an identifier of the third terminal and location information of the third terminal. According to the method provided in the seventh aspect, when the first-type terminal is an unmanned aerial vehicle, the mobility management entity may identify and position the unmanned aerial vehicle based on the received fourth request, feed back, to a USS, whether an identifier of the unmanned aerial vehicle and location information of the unmanned aerial vehicle are identified, and identify and position the unmanned aerial vehicle by using a communication network, so that the unmanned aerial vehicle can be conveniently and quickly supervised.

With reference to the seventh aspect, in a first possible implementation, the fourth request includes area information of a second area, the area information is used to indicate the second area, the fourth request is specifically used to request to position the first-type terminal in the second area, and the third terminal is located in the second area. In this possible implementation, when the first-type terminal is an unmanned aerial vehicle, the mobility management entity may identify and position the unmanned aerial vehicle in the second area based on the received fourth request, feed back, to the USS, whether an identifier of the unmanned aerial vehicle and location information of the unmanned aerial vehicle are identified in the second area, and identify and position the unmanned aerial vehicle in an area/some areas by using the communication network, so that the unmanned aerial vehicle can be conveniently and quickly supervised.

With reference to the seventh aspect or the first possible implementation of the seventh aspect, in a second possible implementation, the first type is an unmanned aerial vehicle.

With reference to the seventh aspect, or the first possible implementation or the second possible implementation of the seventh aspect, in a third possible implementation, the fourth request includes information used to indicate the first type.

According to an eighth aspect, a terminal positioning method is provided. The terminal positioning method includes: An application server sends a fourth request, where the fourth request is used to request to position a first-type terminal; the application server receives a response to the fourth request, where the response to the fourth request includes an identifier of a third terminal and location information of the third terminal, and a type of the third terminal is the first type. According to the method provided in the eighth aspect, when the first-type terminal is an unmanned aerial vehicle, a USS may obtain an identifier of the unmanned aerial vehicle and location information of the unmanned aerial vehicle by sending the fourth request and receiving the response to the fourth request, and identify and position the unmanned aerial vehicle by using a communication network, so that the unmanned aerial vehicle can be conveniently and quickly supervised.

With reference to the eighth aspect, in a first possible implementation, the fourth request includes area information of a second area, the area information is used to indicate the second area, the fourth request is specifically used to request to position the first-type terminal in the second area, and the third terminal is located in the second area. In this possible implementation, when the first-type terminal is an unmanned aerial vehicle, the USS may obtain an identifier of the unmanned aerial vehicle and location information of the unmanned aerial vehicle in the second area by sending the fourth request and receiving the response to the fourth request, and identify and position the unmanned aerial vehicle in an area/some areas by using the communication network, so that the unmanned aerial vehicle can be conveniently and quickly supervised.

With reference to the eighth aspect or the first possible implementation of the eighth aspect, in a second possible implementation, that an application server sends a fourth request includes: The application server sends the fourth request to a border control network element, or the application server sends the fourth request to a second mobility management entity. In this possible implementation, two methods for sending the fourth request are provided for the application server.

With reference to the eighth aspect, or the first possible implementation or the second possible implementation of the eighth aspect, in a third possible implementation, the first type is an unmanned aerial vehicle.

With reference to any one of the eighth aspect, or the first possible implementation to the third possible implementation of the eighth aspect, in a fourth possible implementation, the fourth request includes information used to indicate the first type.

According to a ninth aspect, a terminal positioning method is provided. The terminal positioning method includes: A border control network element receives a fourth request from an application server, where the fourth request is used to request to position a first-type terminal; the border control network element determines a second mobility management entity based on the fourth request, and the border control network element sends the fourth request to the second mobility management entity. According to the method provided in the ninth aspect, when the first-type terminal is an unmanned aerial vehicle, the border control network element sends the received fourth request to the second mobility management entity, so that the second mobility management entity sends an obtained identifier of the unmanned aerial vehicle and obtained location information of the unmanned aerial vehicle to a USS. The USS identifies and positions the unmanned aerial vehicle by using a communication network, so that the unmanned aerial vehicle can be conveniently and quickly supervised.

With reference to the ninth aspect, in a first possible implementation, the fourth request includes information used to indicate the first type.

With reference to the ninth aspect or the first possible implementation of the ninth aspect, in a second possible implementation, the fourth request includes area information of a second area, the area information is used to indicate the second area, and the fourth request is specifically used to request to position the first-type terminal in the second area. In this possible implementation, when the first-type terminal is an unmanned aerial vehicle, the border control network element sends the received fourth request to the second mobility management entity, so that the second mobility management entity sends an obtained identifier of the unmanned aerial vehicle and obtained location information of the unmanned aerial vehicle in the second area to the USS. The USS identifies and positions the unmanned aerial vehicle in an area/some areas by using the communication network, so that the unmanned aerial vehicle can be conveniently and quickly supervised.

With reference to the ninth aspect, or the first possible implementation or the second possible implementation of the ninth aspect, in a third possible implementation, that the border control network element determines a second mobility management entity based on the fourth request includes: The border control network element sends a seventh request to a unified data management entity based on the fourth request, where the seventh request is used to request a mobility management entity serving the first-type terminal, and the seventh request includes the information used to indicate the first type; the border control network element receives a response to the seventh request from the unified data management entity, where the response to the seventh request includes fifth indication information, and the fifth indication information is used to indicate the mobility management entity serving, the first-type terminal; and the border control network element determines the second mobility management entity based on the fifth indication information. In this possible implementation, a method for determining the second mobility management entity is provided for the border control network element.

With reference to the third possible implementation of the ninth aspect, in a fourth possible implementation, the seventh request further includes sixth indication information, and the sixth indication information is used to indicate that a type of a requested network function is a mobility management function.

With reference to the fourth possible implementation of the ninth aspect, in a fifth possible implementation, when the fourth request includes the area information of the second area, the method further includes: The border control network element sends an eighth request to a network function repository function entity based on the fourth request, where the eighth request is used to request a mobility management entity in the second area, and the eighth request includes the area information of the second area; the border control network element receives a response to the eighth request from the network function repository function entity, where the response to the eighth request includes seventh indication information, and the seventh indication information is used to indicate the mobility management entity in the second area; and that the border control network element determines the second mobility management entity based on the fifth indication information includes: The border control network element determines the second mobility management entity based on the fifth indication information and the seventh indication information. In this possible implementation, a method for determining the second mobility management entity in the second area is provided for the border control network element.

With reference to any one of the ninth aspect, or the first possible implementation to the fifth possible implementation of the ninth aspect, in a sixth possible implementation, the first type is an unmanned aerial vehicle.

According to a tenth aspect, a communication apparatus is provided. The communication apparatus includes a communication unit and a processing unit. The communication unit is configured to receive a fourth request, where the fourth request is used to request to position a first-type terminal. The processing unit is configured to position a third terminal based on the fourth request, where the third terminal is the first-type terminal. The communication unit is further configured to send a response to the fourth request to an application server, where the response to the fourth request includes an identifier of the third terminal and location information of the third terminal.

With reference to the tenth aspect, in a first possible implementation, the fourth request includes area information of a second area, the area information is used to indicate the second area, the fourth request is specifically used to request to position the first-type terminal in the second area, and the third terminal is located in the second area.

With reference to the tenth aspect or the first possible implementation of the tenth aspect, in a second possible implementation, the first type is an unmanned aerial vehicle.

With reference to the tenth aspect, or the first possible implementation or the second possible implementation of the tenth aspect, in a third possible implementation, the fourth request includes information used to indicate the first type.

According to an eleventh aspect, a communication apparatus is provided. The communication apparatus includes a communication unit and a processing unit. The processing unit is configured to send a fourth request by using the communication unit, where the fourth request is used to request to position a first-type terminal. The processing unit is further configured to receive a response to the fourth request by using the communication unit, where the response to the fourth request includes an identifier of a third terminal and location information of the third terminal, and a type of the third terminal is the first type.

With reference to the eleventh aspect, in a first possible implementation, the fourth request includes area information of a second area, the area information is used to indicate the second area, the fourth request is specifically used to request to position the first-type terminal in the second area, and the third terminal is located in the second area.

With reference to the eleventh aspect or the first possible implementation of the eleventh aspect, in a second possible implementation, the processing unit is specifically configured to send the fourth request to the border control network element by using the communication unit; or the processing unit is specifically configured to send the fourth request to a second mobility management entity by using the communication unit.

With reference to the eleventh aspect, or the first possible implementation or the second possible implementation of the eleventh aspect, in a third possible implementation, the first type is an unmanned aerial vehicle.

With reference to any one of the eleventh aspect, or the first possible implementation to the third possible implementation of the eleventh aspect, in a fourth possible implementation, the fourth request includes information used to indicate the first type.

According to a twelfth aspect, a communication apparatus is provided. The communication apparatus includes a communication unit and a processing unit. The communication unit is configured to receive a fourth request from an application server, where the fourth request is used to request to position a first-type terminal. The processing unit is configured to determine a second mobility management entity based on the fourth request. The communication unit is further configured to send the fourth request to the second mobility management entity.

With reference to the twelfth aspect, in a first possible implementation, the fourth request includes information used to indicate the first type.

With reference to the twelfth aspect or the first possible implementation of the twelfth aspect, in a second possible implementation, the fourth request includes area information of a second area, the area information is used to indicate the second area, and the fourth request is specifically used to request to position the first-type terminal in the second area.

With reference to the twelfth aspect, or the first possible implementation or the second possible implementation of the twelfth aspect, in a third possible implementation, the processing unit is specifically configured to: send a seventh request to a unified data management entity based on the fourth request by using the communication unit, where the seventh request is used to request a mobility management entity serving the first-type terminal, and the seventh request includes the information used to indicate the first type; receive a response to the seventh request from the unified data management entity by using the communication unit, where the response to the seventh request includes fifth indication information, and the fifth indication information is used to indicate the mobility management entity serving the first-type terminal; and determine the second mobility management entity based on the fifth indication information.

With reference to the third possible implementation of the twelfth aspect, in a fourth possible implementation, the seventh request further includes sixth indication information, and the sixth indication information is used to indicate that a type of a requested network function is a mobility management function.

With reference to the fourth possible implementation of the twelfth aspect, in a fifth possible implementation, when the fourth request includes the area information of the second area, the processing unit is further configured to send an eighth request to a network function repository function entity based on the fourth request by using the communication unit, where the eighth request is used to request a mobility management entity in the second area, and the eighth request includes the area information of the second area; the communication unit is further configured to receive a response to the eighth request from the network function repository function entity, where the response to the eighth request includes seventh indication information, and the seventh indication information is used to indicate the mobility management entity in the second area; and the processing unit is specifically configured to determine the second mobility management entity based on the fifth indication information and the seventh indication information.

With reference to any one of the twelfth aspect, or the first possible implementation to the fifth possible implementation of the twelfth aspect, in a sixth possible implementation, the first type is an unmanned aerial vehicle.

In addition to the first and second parts above, the following parts are disclosed:

According to a thirteenth aspect, a communication apparatus is further provided. The communication apparatus includes a memory, a processor, at least one communication interface, and a communication bus. The memory is configured to store computer-executable instructions. The processor, the memory, and the at least one communication interface are connected by using the communication bus. The processor executes the computer-executable instructions stored in the memory, to enable the communication apparatus to implement the method provided in any one of the first aspect, the second aspect, the third aspect, the seventh aspect, the eighth aspect, and the ninth aspect. The apparatus may exist in a product form of a chip.

According to a fourteenth aspect, a communication system is further provided. The communication system includes the communication apparatuses provided in the fourth aspect, the fifth aspect, and the sixth aspect, or includes the communication apparatuses provided in the tenth aspect, the eleventh aspect, and the twelfth aspect.

According to a fifteenth aspect, a computer-readable storage medium including instructions is further provided. When the computer-readable storage medium runs on a computer, the computer is enabled to perform the method provided in any one of the first aspect, the second aspect, the third aspect, the seventh aspect, the eighth aspect, and the ninth aspect.

According to a sixteenth aspect, a computer program product including instructions is further provided. When the computer program product runs on a computer, the computer is enabled to perform the method provided in any one of the first aspect, the second aspect, the third aspect, the seventh aspect, the eighth aspect, and the ninth aspect.

For technical effects brought by any design manner in the fourth aspect to the sixth aspect and the tenth aspect to the sixteenth aspect, refer to the technical effects brought by corresponding design manners in the first aspect to the third aspect and the seventh aspect to the ninth aspect. Details are not described herein again.

It should be noted that various possible implementations of any one of the foregoing aspects may be combined provided that the solutions are not contradictory.

DESCRIPTION OF EMBODIMENTS

The following describes technical solutions in embodiments of this application with reference to accompanying drawings in the embodiments of this application. In the descriptions of this application, "/" means "or" unless otherwise specified. For example, A/B may represent A or B. The term "and/or" in this specification describes only an association relationship for describing associated objects and represents that there may be three relationships. For example, A and/or B may represent the following three cases: Only A exists, both A and B exist, and only B exists. In addition, unless otherwise specified, "a plurality of" in the descriptions of this application means two or more than two.

In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference.

The technical solutions in the embodiments of this application may be applied to various communication systems, for example, orthogonal frequency division multiple access (OFDMA for short), single-carrier frequency division multiple access (SC-FDMA for short), and other systems. The terms "system" and "network" can be interchanged with each other. The OFDMA system may implement wireless technologies such as evolved universal terrestrial radio access (E-UTRA for short) and ultra-mobile broadband (UMB for short). The E-UTRA is an evolved version of a universal mobile telecommunications system (UMTS for short). The 3rd generation partnership project (3GPP for short) uses a new version of the E-UTRA in long term evolution (LTE for short) and various versions evolved based on LTE. A 5th generation (5G for short) communication system or new radio (NR for short) is a next generation communication system under research. In addition, the communication system may further be applicable to a future-oriented communication technology, and is applicable to the technical solutions provided in the embodiments of this application.

Figure 1:
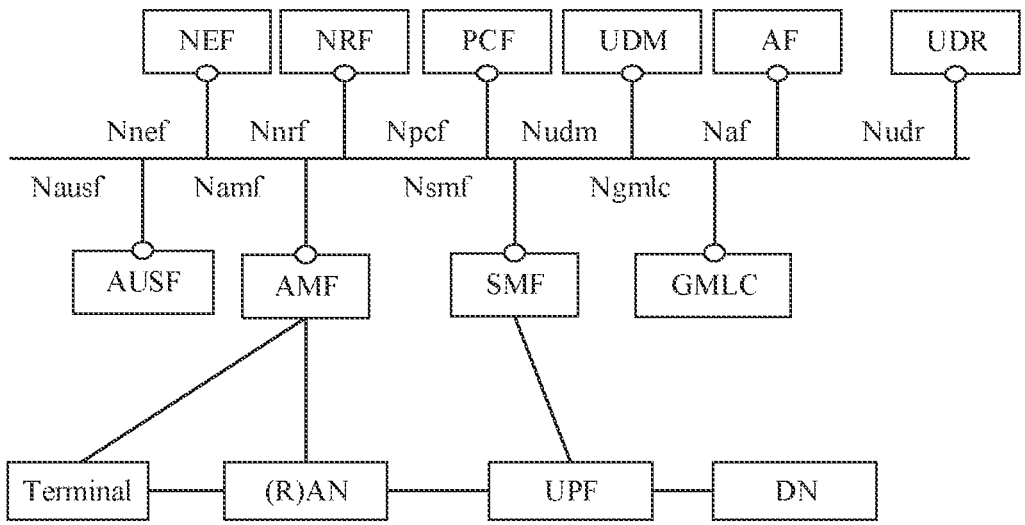
FIG. 1 is a schematic diagram of a network architecture of a 5G network according to an embodiment of this application.

For example, methods provided in the embodiments of this application may be applied to a 5G system shown in FIG. 1. As shown in FIG. 1, the 5G system may include one or more of the following network function (NF for short) entities: an authentication server function (AUSF for short) entity, an access and mobility management function (AMF for short) entity, a data network (DN for short), a unified data management (UDM for short) entity, a policy control function (PCF for short) entity, a (radio) access network ((R)AN for short) device, a user plane function (UPF for short) entity, a terminal, an application function (AMF for short) entity, a session management function (SMF for short) entity, a network exposure function (NEF for short) entity, a gateway mobile location center (GMLC for short) entity, a network function repository function (NRF for short) entity, and a unified data repository (UDR for short) entity.

The RAN device is mainly responsible for functions on an air interface side, such as radio resource management, quality of service (QoS for short) management, and data compression and encryption. The RAN device may include base stations in various forms, such as a macro base station, a micro base station (also referred to as a small cell), a relay station, and an access point. In the 5G system, a base station is referred to as a gNB. The RAN device in the 5G system may also be referred to as an NG-RAN device or an NG-RAN node.

The AMF entity belongs to a core network entity, and is mainly responsible for a mobility management processing part, for example, functions such as access control, mobility management, attaching and detaching, and SMF entity selection. When the AMF entity provides a service for a session in a terminal, the AMF entity provides a control plane storage resource for the session, to store a session identifier, an SMF entity identifier associated with the session identifier, and the like.

The NEF entity mainly supports secure interaction between a 3GPP network and a third-party application. The NEF can securely expose (exposure) a network capability and an event to a third party, to enhance or improve application service quality. The 3GPP network can also securely obtain related data from the third party, to enhance intelligent decision-making of the network. In addition, the NEF entity supports restoring structured data from the UDR entity or storing structured data to the UDR entity.

The NRF entity is mainly used to maintain network element information on a core network, support network element registration and update, and provide a query service for an external system.

The UDM entity is mainly configured to manage unified data (for example, user data and user context).

The UDR entity is mainly responsible for storing structured data, and stored content includes subscription data and policy data, externally exposed structured data, and application-related data.

The GMLC entity is configured to support, a positioning service of the 3GPP network, and there may be a plurality of GMLC entities in one public land mobile network (PLMN for short). The GMLC entity is the first node for an external location program to access the PLMN. The GMLC entity performs a registration authorization check and requests routing information from the UDM entity. After performing the registration authorization check, the GMLC entity sends a position request to the AMF entity and receives a final location estimate.

Figure 2:
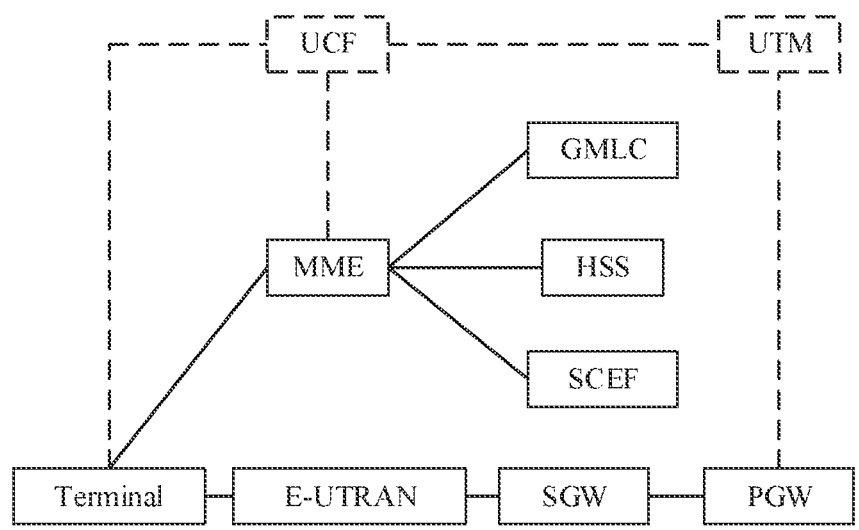
FIG. 2 is a schematic diagram of a network architecture of a 4G network according to an embodiment of this application.

For example, the methods provided in the embodiments of this application may be further applied to an evolved packet system (EPS for short) network (namely, commonly referred to as a 4G system) shown in FIG. 2. As shown in FIG. 2, the EPS network may include one or more of the following network entities: a terminal, an evolved universal terrestrial radio access network (E-UTRAN for short) device, a serving gateway (SGW for short), a packet data network gateway (PGW for short), a mobility management entity MME for short), a home subscriber server (HSS for short), a GMLC entity, and a service capability exposure function (SCEF for short) entity.

The E-UTRAN device includes a plurality of evolved NodeBs (eNB or eNodeB for short), the eNodeBs are interconnected through an X2 interface, the eNodeBs interact with an evolved packet core network (EPC for short) through SI interfaces, and the eNodeBs are interconnected with a terminal through Uu interfaces. The E-UTRAN device is equivalent to the RAN device in the 5G system.

The MME is mainly responsible for mobility management and session management, and supports non-access stratum (NAS for short) signaling and security thereof, management of a tracking area (TA for short) list, selection of a PGW and an SGW, MME selection during inter-MME handover, selection of a serving GPRS support node (SGSN for short) in a process of handover to a 2G/3G access system, user authentication, roaming control and bearer management, and mobility management between core network nodes of different 3GPP access networks. The MME is equivalent to the AMF entity in the 5G system.

The HSS is a database used to store subscription information of a subscriber, and a home network may include one or more HSSs. The HSS is responsible for storing subscriber-related information, such as a subscriber identifier, number and routing information, security information, location information, and profile information. The HSS is equivalent to the UDM entity in the 5G system.

The GMLC entity is configured to support a positioning service of the 3GPP network, and there may be a plurality of GMLC entities in one PLMN. The GMLC entity is the first node for an external location program to access the PLMN. The GMLC entity performs a registration authorization check and requests routing information from the HSS. After performing the registration authorization check, the GMLC entity sends a position request to the MME and receives a final location estimate.

The SCEF entity provides functions of securely exposing a service and a function that are provided by a 3GPP network interface, and discovering a public service. The SCEF entity provides access to a network function by using a network application programming interface (API for short, which may also be referred to as a service) defined on a T8 interface. The SCEF entity is equivalent to the NEF entity in the 5G system.

The "entity" in the foregoing embodiment may also be replaced with a "network element" or a "device".

The network elements in the embodiments of this application include a terminal, a mobility management entity, an application server, a border control network element, and the like.

The terminal may also be referred to as user equipment (UE for short), a terminal, an access terminal, a subscriber unit, a subscriber station, a mobile station, a remote station, a remote terminal, a mobile device, a user terminal, a wireless communication device, a user agent, or a user apparatus. The terminal may be an unmanned aerial vehicle, an internet of things (IoT for short) device, a vehicle-to-everything (V2X for short) device, a station (station, ST for short) in a wireless local area network (AVIAN for short), a cellular phone, a cordless telephone set, a session initiation protocol (SIP for short) telephone set, a wireless local loop (WLL for short) station, a personal digital assistant (PDA for short) device, a handheld device with a wireless communication function, a computing device or another processing device connected to a wireless modem, a vehicle-mounted device, or a wearable device (which may also be referred to as a wearable intelligent device). Alternatively, the terminal may be a terminal in a next generation communication system, for example, a terminal in the 5G system, a terminal in a future evolved PLMN, or a terminal in an NR system.

The mobility management entity may be the AMF in the 5G system, and may be the MME in the 4G system.

The border control network element may be the GMLC or the NEF in the 5G system, and may be the GMLC or the SCEF in the 4G system.

The application server is a device that provides an application service for a first-type terminal in the embodiments of this application. The application server may be the AMF entity in the 5G system.

Figure 3:
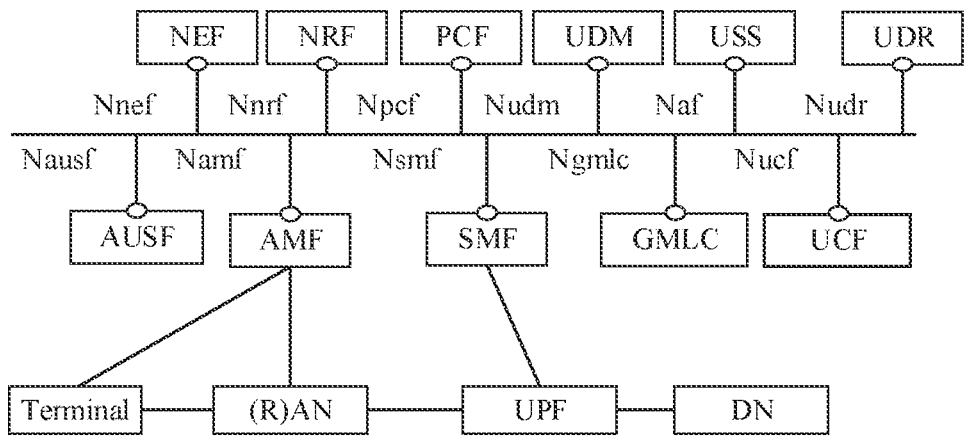
FIG. 3 is a schematic diagram of still another network architecture of a 5G network according to an embodiment of this application.

When the first-type terminal apparatus is an unmanned aerial vehicle, the border control network element may alternatively be an unmanned aerial vehicle control function (UCF for short) entity. The application server may be specifically an unmanned aerial vehicle system server (USS for short), where the UAS refers to an unmanned aerial vehicle system (UM system). For locations of the UCF and the USS in the 4G system, refer to FIG. 2. For locations of the UCF and the USS in the 5G system, refer to FIG. 3.

The ICF entity supports configuring communication parameters for the unmanned aerial vehicle, obtains, from the USS, a no-fly zone of the unmanned aerial vehicle, distributes the no-fly zone, provides flight-assistance authorization for the unmanned aerial vehicle, receives unmanned aerial vehicle service subscription from the USS, and interacts with other core network elements (such as the AMF and GMLC) to provide a subscribed unmanned aerial vehicle service, and the like for the USS. The UCF entity is a network element configured to support communication and supervision of the unmanned aerial vehicle in a mobile communication network, and is specially configured to process an unmanned aerial vehicle service.

The USS may be a functional module (for example, a third-party unmanned aerial vehicle cloud) in unmanned aerial vehicle traffic management (UTM for short), and supports functions such as flight operation authorization, flight monitoring, flight alarm, and flight control.

The methods provided in the embodiments of this application may be applied to a scenario in which the first-type terminal needs to be identified and/or positioned. To make the embodiments of this application clearer, the methods provided in the embodiments of this application are described in the following embodiments by using an example in which the first-type terminal is an unmanned aerial vehicle. For ease of description, the embodiments of this application are described by using an example in which the provided methods are applied to the NR system or the 5G system. The mobility management entity is denoted as an AMF (that is, all AMFs below may be replaced with mobility management entities) below, the border control network element is denoted as an NEF (that is, all NEFs below may be replaced with border control network elements) below, and the application server is referred to as a USS (that is, all USSs below may be replaced with application servers) below. The network elements in the embodiments of this application are all network elements in the NR system or the 0.5G system. It may be understood that when the methods provided in the embodiments of this application are applied to the 4G system, these network elements only need to be replaced with network elements that have a same or similar function in the 4G system.

A system architecture and a service scenario that are described in the embodiments of this application are intended to describe the technical solutions in the embodiments of this application more clearly, and do not constitute a limitation to the technical solutions provided in the embodiments of this application. A person of ordinary skill in the art may know that with evolution of the network architecture and emergence of a new service scenario, the technical solutions provided in the embodiments of this application are also applicable to similar technical problems.

It should be noted that nouns or terms in the embodiments of this application may refer to each other. This is not limited.

Figure 4:
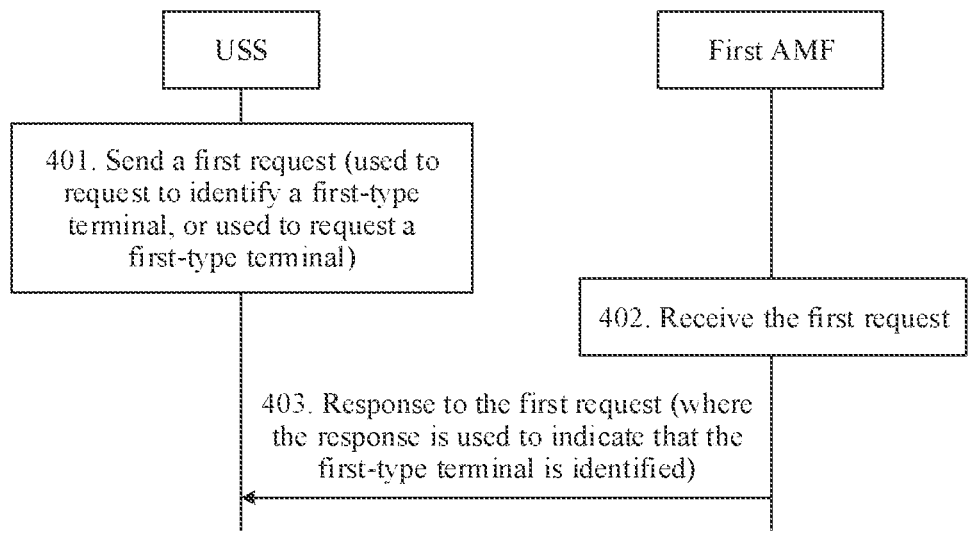
FIG. 4 is an interaction flowchart of a terminal identification method according to an embodiment of this application.

An embodiment of this application provides a terminal identification method. As shown in FIG. 4, the terminal identification method includes the following steps.

401. A USS sends a first request.

The first request may be used to request to identify a first-type terminal, or may be used to request a first-type terminal.

The first-type terminal may be various types of terminals mentioned in the foregoing embodiments. For example, the first type is an unmanned aerial vehicle.

402. A first. AMF receives the first request.

The first AMF may be an AMF serving the first-type terminal.

Optionally, the first request includes information used to indicate the first type. The information used to indicate the first type may be an identifier of the first type or a name of the first type. For example, the first type is an unmanned aerial vehicle. In the first request, two bits may be used to carry the identifier of the first type. When the two bits are "01" (that is, the identifier of the first type is "01"), the first type is an unmanned aerial vehicle. The name of the first type may be an unmanned aerial vehicle or a UAV.

Optionally, the first request further includes indication information 1, the indication information 1 is used to indicate to identify a terminal, and the indication information 1 and the information used to indicate the first type that are in the first request are jointly used to request to identify the first-type terminal or used to request the first-type terminal. When the first request does not include the indication information 1, a function of the indication information 1 may be implemented by using a message type or a message name of the first request.

403. The first AMF sends a response to the first request to the USS based on the first request.

Correspondingly, the USS receives the response to the first request. The response to the first request is used to indicate that the first-type terminal is identified.

Optionally, the response to the first request includes an identifier of a first terminal and/or first indication information, a type of the first terminal is the first type, and the first indication information is used to indicate that the first-type terminal is identified.

The first terminal is a terminal identified by the first AMF. The first terminal may include one or more terminals. An identifier of the terminal may be an international mobile subscriber identity (IMSI for short), an international mobile equipment identity (international mobile equipment identify, MEI for short), an interact protocol (IP for short) address (address), a uniform resource location (URL for short), or the like.

For example, step 403 may include: The first AMF identifies the first-type terminal based on the first request; and the first AMF sends the response to the first request to the USS.

During specific implementation, the step "the first AMF identifies the first-type terminal based on the first request" may be implemented in any one of the following manners (1) to (3).

Manner (1): The first AMF queries, from a UDM, device type information of the terminal or unmanned aerial vehicle subscription information (that is, information indicating whether the terminal subscribes to an unmanned aerial vehicle service, where this case is applicable to a scenario in which the first-type terminal is an unmanned aerial vehicle), to determine whether the terminal is the first-type terminal.

During specific implementation, the manner (1) may include: The first AMF sends the identifier of the terminal to the UDM; the UDM determines subscription information of the terminal based on the identifier of the terminal, where the subscription information of the terminal includes the device type information of the terminal or the unmanned aerial vehicle subscription information; the UDM returns the device type information of the terminal or the unmanned aerial vehicle subscription information to the first AMF based on the subscription information of the terminal; and the first AMF determines, based on the device type information of the terminal or the unmanned aerial vehicle subscription information, whether the terminal is the first-type terminal.

Manner (2): The first AMF determines, based on device type information or capability information (that is, whether the terminal has an air communication capability, where this case is applicable to a scenario in which the first-type terminal is an unmanned aerial vehicle) reported by the terminal, whether the terminal is the first-type terminal.

During specific implementation of the manner (2), the terminal may report the device type information or the capability information of the terminal in a process of interacting with the first AMF. For example, the terminal adds the device type information or the capability information of the terminal to NAS signaling (for example, an attach request or a service request) exchanged with the first AMF, and the first AMF may determine, based on the device type information or the capability information reported by the terminal, whether the terminal is the first-type terminal.

Manner (3): The first AMF determines, based on location information of the terminal, whether the terminal is the first-type terminal.

During specific implementation of the manner (3), for example, the first NNW determines a terminal of an unmanned aerial vehicle type. When the first AMF determines that the terminal is attached to an aerial cell or the terminal is located in the air, the first AMF determines that the terminal is an unmanned aerial vehicle.

According to the method provided in this embodiment of this application, when the first-type terminal is an unmanned aerial vehicle, the first AMF may identify the unmanned aerial vehicle based on the received first request, and feed back, to the USS, whether the unmanned aerial vehicle is identified. The USS identifies the unmanned aerial vehicle by using a communication network, so that the unmanned aerial vehicle can be conveniently and quickly supervised.

In an implementation scenario (denoted as an implementation scenario 1) of this embodiment of this application, during specific implementation, step 401 may include: The USS sends the first request to an NEF. In this case, the NEF receives the first request from the USS, determines the first AMF based on the first request, and sends the first request to the first AMF. During specific implementation, step 402 may include: The first AMF receives the first request from the NEF.

In the implementation scenario 1, during specific implementation, the step "the NEF determines the first AMF based on the first request" may be implemented in the following manner 1 or manner 2.

Manner 1: The NEF obtains, from a UDM, information about AMFs serving the first-type terminal, and determines the first AMF based on the obtained information about the AMFs.

During specific implementation, the manner 1 may include: The NEF sends a fifth request to the UDM based on the first request, where the fifth request is used to request the AMFs serving the first-type terminal, and the fifth request includes the information used to indicate the first type; the UDM receives the fifth request from the NEF, determines, based on the fifth request, the AMFs serving the first-type terminal, and sends a response to the fifth request to the NEF, where the response to the fifth request includes second indication information, and the second indication information is used to indicate the AMFs serving the first-type terminal; and the NEF receives the response to the fifth request from the UDM, determines, based on the second indication information in the response to the fifth request, the AMFs serving the first-type terminal, and further determines the first AMF. The first AMF may be any AMF in the AMFs serving the first-type terminal.

The second indication information may be identifiers of the AMFs serving the first-type terminal. The identifiers of the AMFs may be names of the AMFs, addresses of the AMFs, or the like.

Optionally, the fifth request further includes third indication information, and the third indication information is used to indicate that a type of a requested network function is a mobility management function.

The UDM stores subscription information of a terminal, and the subscription information of the terminal includes device type information of the terminal or unmanned aerial vehicle subscription information (that is, information indicating whether the terminal subscribes to an unmanned aerial vehicle service, where this case is applicable to a scenario in which the first-type terminal is an unmanned aerial vehicle). The UDM may determine, based on the information used to indicate the first type, the device type information of the terminal or the unmanned aerial vehicle subscription information, and the information about the AMFs serving the terminal, the AMFs serving the first-type terminal, and send, to the NEF the information about the AMFs serving the first-type terminal. The NEF determines the first AMF in the AMFs serving the first-type terminal.

Manner 2: The NEF determines the first AMF based on information reported by AMFs.

During specific implementation of the manner 2, the NEF may subscribe to a service event of the first-type terminal from the AMFs. In this case, when the AMFs serve the first-type terminal, the AMFs may report information about the AMFs to the NEF, so that the NEF determines the AMFs serving the first-type terminal, and determines the first AMF in the AMFs serving the first-type terminal. The first AMF may be any AMF in the AMFs serving the first-type terminal.

In another implementation scenario (denoted as an implementation scenario 2) of this embodiment of this application, during specific implementation, step 401 may include: The USS sends the first request to the first AMF. In this case, during specific implementation, step 402 may, include: The first AMF receives the first request from the USS.

In the implementation scenario 2, before step 401, the method may further include: The USS determines the first AMF. During specific implementation of the step "the USS determines the first AMF", the USS is similar to the NEF, and may also determine the first AMF in the foregoing manner 1 or manner 2. A difference lies only in that the USS determines the first AMF herein. In addition, the USS may further obtain information about the first AMF from the NEF. The NEF may determine the first AMF in the foregoing manner 1 or manner 2.

Optionally, the method further includes: (11) the first AMF positions the identified first-type terminal based on the first request. A method for positioning a terminal by the AMF is well known by a person skilled in the art, and details are not described herein. In this case, the first request may be further used to request to position the first-type terminal. Step (11) may be performed after step 402 and before step 403. In this case, the response to the first request in step 403 includes an identifier of the first terminal, and the response to the first request further includes location information of the first terminal. Step (11) may alternatively be performed after step 403. In this case, after positioning the identified first-type terminal, the first AMF may report the identifier and the location information of the identified terminal to the USS. When the first AMF performs step (11), after sending the first request, the USS only needs to wait for the response fed back by the first AMF, and does not need to send another additional indication to the first AMF. When the first NNW does not perform step (11), the USS may perform a subsequent method based on information included in the response to the first request. The following separately describes the subsequent method by using a case 1 and a case 2 as examples.

Case 1: The response to the first request includes the first indication information.

In the case 1, the foregoing method further includes the following steps.

(21) The USS sends a second request to the first AMF based on the response to the first request, where the second request is used to request to position the identified first-type terminal, or used to request the location information of the identified first-type terminal. Correspondingly, the first AMF receives the second request from the USS.

(22) The first AMF sends a response to the second request to the USS based on the second request, where the response to the second request includes an identifier of a second terminal and location information of the second terminal, and a type of the second terminal is the first type. Correspondingly, the USS receives the response to the second request, and determines the first-type terminal (that is, the second terminal) based on the response to the second request.

For example, during specific implementation, step (22) may include: The first AMF positions the identified first-type terminal based on the second request, and sends the response to the second request to the USS.

The second terminal is a terminal identified by the first AMF based on the first request, and the second terminal may include one or more terminals.

Optionally, the second request includes information used to indicate the first type.

Optionally, the second request further includes indication information 2, the indication information 2 is used to indicate to position a terminal, and the indication information 2 and the information used to indicate the first type that are in the second request are jointly used to request to position the first-type terminal. When the second request does not include the indication information 2, a function of the indication information 2 may be implemented by using a message type or a message name of the second request.

Case 2: The response to the first request includes the identifier of the first terminal.

In the case 2, the foregoing method further includes the following steps.

(31) The USS sends a third request to the first AMF based on the response to the first request, where the third request is used to request to position the first terminal, or used to request the location information of the first terminal. Correspondingly, the first AMF receives the third request from the USS.

(32) The first AMF sends a response to the third request to the USS based on the third request, where the response to the third request includes the location information of the first terminal. Correspondingly, the USS receives the response to the third request from the first AMF, and determines the location information of the first terminal based on the response to the third request.

For example, during specific implementation, step (32) may include: The first AMF positions the first terminal based on the third request, and sends the response to the third request to the USS.

Optionally, the third request includes the identifier of the first terminal.

Optionally, the third request further includes indication information 3, the indication information 3 is used to indicate to position a terminal, and the indication information 3 and the identifier of the first terminal that are in the third request are jointly used to request to position the first terminal, or used to request the location information of the first terminal. When the third request does not include the indication information 3, a function of the indication information 3 may be implemented by using a message type or a message name of the third request.

In addition, the second request/the third request may further include some positioning-related parameters, for example, information such as positioning precision and a location reporting periodicity, it may be understood that, when the second request/third request further includes the positioning precision, the location information of the first-type terminal included in the response to the second request/third request needs to meet a positioning precision requirement. When the second request/third request further includes the location reporting periodicity, the first AMF needs to periodically report the location information of the first-type terminal to the USS based on the information.

When the first-type terminal is an unmanned aerial vehicle, after obtaining the location information of the unmanned aerial vehicle, the USS may determine, based on the location information of the unmanned aerial vehicle, whether the unmanned aerial vehicle approaches or enters a no-fly zone (for example, an airport or an important activity site) of the unmanned aerial vehicle, to manage the unmanned aerial vehicle. Certainly, the US'S may also notify the first AMF of the no-fly zone of the unmanned aerial vehicle. After determining whether the unmanned aerial vehicle approaches or enters the no-fly zone of the unmanned aerial vehicle, the first AMF notifies the USS of a determining result, to manage the unmanned aerial vehicle.

Optionally, the first request includes area information of a first area, the area information is used to indicate the first area, and the first request is specifically used to request to identify the first-type terminal in the first area. In this case, the first terminal is located in the first area, or the first indication information is specifically used to indicate that the first-type terminal is identified in the first area.

The first area may be one or more cells. A cell in the first area may be an aerial cell (that is, a cell that provides air radio signal coverage), a normal cell (that is, a non-aerial cell), or a combination thereof. In this case, the area information of the first area may be identification information of the cell. Alternatively, the first area may be a TA. In this case, the area information of the first area may be identification information of the TA. Alternatively, the first area may be an area circled by a specific shape (for example, a polygon or a circle), or may be a three-dimensional area (for example, a no-fly zone of an unmanned aerial vehicle), an administrative area, or the like. In this case, the area information of the first area may be longitude and latitude information of the first area, description information of the three-dimensional area, or an identifier of the administrative region. For an unmanned aerial vehicle, the first area is generally a supervision area of the unmanned aerial vehicle, for example, an airport or an important activity site.

A service area of the first AMF at least partially overlaps the first area.

When the first request includes the area information of the first area, during specific implementation, step 403 includes: The first AMF identifies the first-type terminal in the first area based on the first request, and may specifically identify the first-type terminal in the overlapping area of the service area of the first AMF and the first area, and send the response to the first request to the USS. When the response to the first request includes the identifier of the first terminal, the first terminal is located in the first area, and is specifically located in the overlapping area of the service area of the first AMF and the first area. Alternatively, when the response to the first request includes the first indication information, the first indication information is specifically used to indicate that the first-type terminal is identified in the first area.

If the first request includes the area information of the first area, during specific implementation, the step "the NEF determines the first AMF based on the first request" includes: The NEF determines the first AMF in the first area based on the first request. Specifically, the NEF may determine the first AMF in the first area in the following manner 3 or manner 4.

Manner 3: The NEF obtains, from a UDM, information about AMFs serving the first-type terminal, obtains, from an NRF, information about AMFs in the first area, and determines the first AMF based on the information about the AMFs serving the first-type terminal and the information about the AMFs in the first area.

During specific implementation of the manner 3, the NEF may obtain, from the UDM in the manner 1, the information about the AMFs serving the first-type terminal.

During specific implementation of the manner 3, that the NEF obtains, from an NRF, information about AMFs in the first area may specifically include: The NEF sends a sixth request to the NRF based on the first request, where the sixth request is used to request the AMFs in the first area, and the sixth request includes the area information of the first area; the NRF receives the sixth request from the NEF, determines the AMFs in the first area based on the area information of the first area in the sixth request and a correspondence between an AMF and a service area of the AMF, and sends a response to the sixth request to the NEF, where the response to the sixth request includes fourth indication information, and the fourth indication information is used to indicate the AMFs in the first area; and the NEF receives the response to the sixth request from the NRF, to obtain the information about the AMF's in the first area.

For example, when the area information of the first area is the identifier of the cell, if the area information of the first area is identifiers of a cell 1, a cell 2, and a cell 3, a service area of an AMF 1 includes the cell 1, and a service area of an AMF 2 includes the cell 2 and the cell 3, the AMFs in the first area are the AMF 1 and the AMF 2.

During specific implementation of the manner 3, the NEF may determine, based on the information about the AMFs serving the first-type terminal (that is, the information indicated by the second indication information) and the information about the AMFs in the first area (that is, the information indicated 1w the fourth indication information), AMFs that are in the first area and that serve the first-type terminal, and determine the first AMF in the AMFs that are in the first area and that serve the first-type terminal, where the first AMF may be any AMF in the AMFs that are in the first area and that serve the first-type terminal.

Manner 4: The NEF determines the first AMF based on information reported by AMFs.

During specific implementation of the manner 4, the NEF may subscribe to a service event of the first-type terminal from AMFs in the first area. In this case, when the AMFs in the first area serve the first-type terminal, the AMFs in the first area may report information about the AMFs to the NEF, so that the NEF determines the AMFs that are in the first area and that serve the first-type terminal, and determines the first AMF in the AMFs that are in the first area and that serve the first-type terminal. The first AMF may be any AMF in the AMFs that are in the first area and that serve the first-type terminal.

When the first request includes the area information of the first area, during specific implementation, step (ii) may include: The first AMF positions, based on the first request, the first-type terminal identified in the first area (which may be specifically an overlapping area of a service area of the first AMF and the first area).

When the first request includes the area information of the first area, the second request may also include the area information of the first area. In this case, the second request is specifically used to request to position the first-type terminal identified in the first area, or used to request the location information of the first-type terminal in the first area.

When the second request includes the area information of the first area, during specific implementation, step (22) may include: The first AMF positions, based on the second request, the first-type terminal identified in the first area (which may be specifically the overlapping area of the service area of the first AMF and the first area), and sends the response to the second request to the USS. It may be understood that the second terminal in the foregoing embodiment is located in the first area.

In addition, when the first request includes the area information of the first area, in the implementation scenario 1, before step 402, the foregoing steps "the USS sends the first request to art NEF, and the NEF receives the first request from the USS, determines the first AMF based on the first request, and sends the first request to the first AMF" may be performed, or the following step (41) to step (43) may be performed.

(41) The USS sends a ninth request to the NEF, where the ninth request is used to request to identify the first-type terminal in a third area, and the ninth request may include area information of the third area and the information used to indicate the first type.

(42) The NEF determines the first area based on the third area, and determines the first AMF based on the first area and the information used to indicate the first type. The first area is a subset of the third area.

(43) The NEF sends the first request to the first AMF.

The third area may be one or more cells. The cell in the third area may be an aerial cell, a normal cell, or a combination thereof. In this case, the area information of the third area may be identification information of the cell. Alternatively, the third area may be a TA. In this case, the area information of the third area may be identification information of the TA. Alternatively, the third area may be an area circled by a specific shape (for example, a polygon or a circle), or may be a three-dimensional area (for example, a no-fly zone of an unmanned aerial vehicle), an administrative area, or the like. In this case, the area information of the third area may be longitude and latitude information of the third area, description information of the three-dimensional area, or an identifier of the administrative region. For an unmanned aerial vehicle, the third area is generally a supervision area of the unmanned aerial vehicle, for example, an airport or an important activity site.

The method for determining the first area by the NEF based on the third area may be designed based on an actual application scenario. For example, if the third area is the no-fly zone of the unmanned aerial vehicle, the NEF may determine an area that is in the no-fly zone and that is covered by each AMF serving the first-type terminal, and the NEF may determine the first area as an area that is in the no-fly zone and that is covered by a specific AMF serving the first-type terminal, and determine that the specific AMF is the first AMF. For another example, if the third area is a plurality of cells, the NEF may determine that an area that is in the plurality of cells and that is covered by a same AMF serving the first-type terminal is the first area, and determine that the same AMF is the first AMF.

Figure 5:
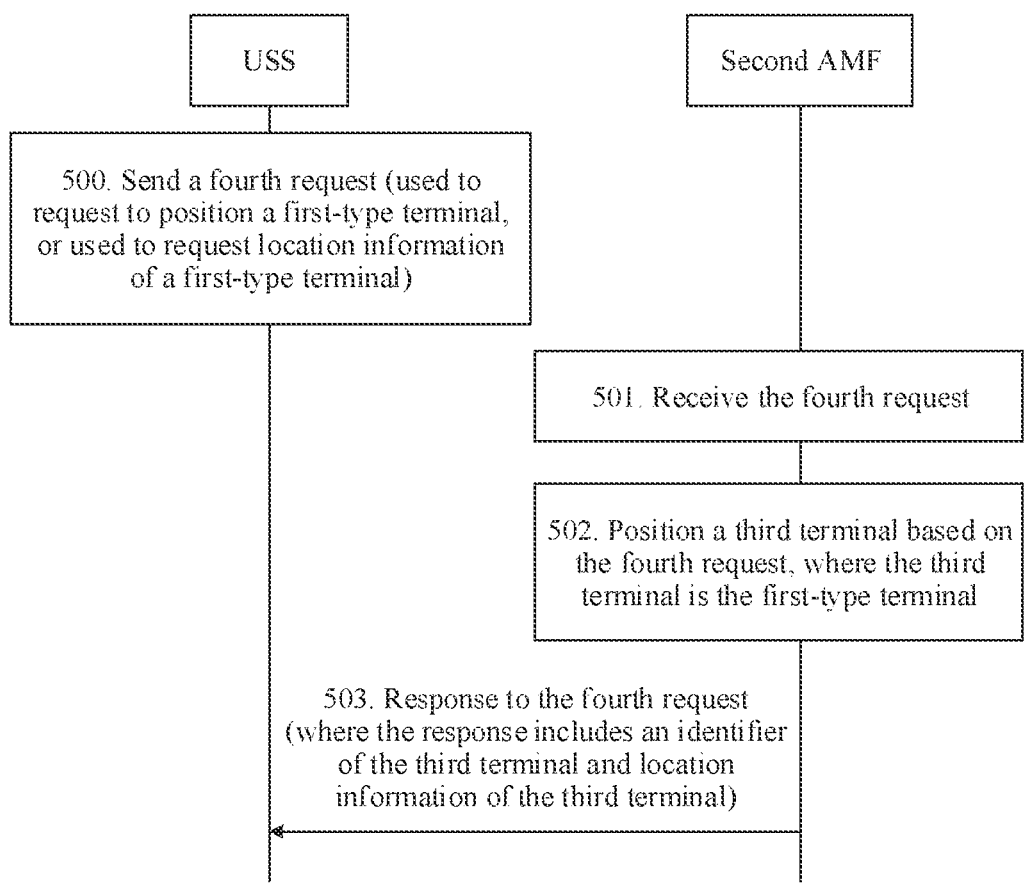
FIG. 5 is an interaction flowchart of a terminal positioning method according to an embodiment of this application.

An embodiment of this application further provides a terminal positioning method. As shown in FIG. 5, the terminal positioning method includes the following steps.

500. A USS sends a fourth request.

The fourth request is used to request to position a first-type terminal, or is used to request location information of a first-type terminal. The first-type terminal may be various types of terminals mentioned in the foregoing embodiments. For example, the first type is an unmanned aerial vehicle. A second AMF may be an AMF serving the first-type terminal.

501. The second AMF receives the fourth request.

Optionally, the fourth request includes information used to indicate the first type. The information used to indicate the first type may be an identifier of the first type or a name of the first type. For example, the first type is an unmanned aerial vehicle. In the fourth request, two bits may be used to carry the identifier of the first type. When the two bits are "01" (that is, the identifier of the first type is "01"), the first type is an unmanned aerial vehicle. The name of the first type may be an unmanned aerial vehicle or a UM'.

Optionally, the fourth request further includes indication information 4, the indication information 4 is used to indicate to position a terminal, and the indication information 4 and the information used to indicate the first type that are in the fourth request are jointly used to request to position the first-type terminal or used to request the location information of the first-type terminal. When the fourth request does not include the indication information 4, a function of the indication information 4 may be implemented by using a message type or a message name of the fourth request.

502. The second AMF positions a third terminal based on the fourth request.

The third terminal is the first-type terminal.

Before step 502, the second AMF may identify the first-type terminal, to determine that the third terminal is the first-type terminal. The third terminal may be one or more terminals. The second AMF may identify the first-type terminal in any one of the foregoing manners (1) to (3). A difference lies only in that an AMF identifying the first-type terminal herein is the second AMF.

A method for positioning a terminal by the AMF is well known by a person skilled in the art, and details are not described herein.

503. The second AMF sends a response to the fourth request to the USS, where the response to the fourth request includes an identifier of the third terminal and location information of the third terminal. Correspondingly, the USS receives the response to the fourth request, and may determine the identifier of the third terminal and the location information of the third terminal based on the response to the fourth request.

An identifier of a terminal may be an IMSI, an IMEI, an IP address, a URL, or the like.

In addition, the fourth request may further include some positioning-related parameters, for example, information such as positioning precision and a location reporting periodicity. It may be understood that, when the fourth request further includes the positioning precision, the location information of the first-type terminal included in the response to the fourth request needs to meet a positioning precision requirement. When the fourth request further includes the location reporting periodicity, the second AMF needs to periodically report the location information of the first-type terminal to the USS based on the information.

When the first-type terminal is an unmanned aerial vehicle, after obtaining location information of the unmanned aerial vehicle, the USS may determine, based on the location information of the unmanned aerial vehicle, whether the unmanned aerial vehicle approaches or enters a no-fly zone (for example, an airport or an important activity site) of the unmanned aerial vehicle, to manage the unmanned aerial vehicle. Certainly, the USS may notify the second AMF of the no-fly zone of the unmanned aerial vehicle. After determining whether the unmanned aerial vehicle approaches or enters the no-fly zone of the unmanned aerial vehicle, the second AMF notifies the USS of a determining result, to manage the unmanned aerial vehicle.

According to the method provided in this embodiment of this application, when the first-type terminal is an unmanned aerial vehicle, the second AMF may identify and position the unmanned aerial vehicle based on the received fourth request, feed back, to the USS, whether an identifier of the unmanned aerial vehicle and location information of the unmanned aerial vehicle are identified, and identify and position the unmanned aerial vehicle by using a communication network, so that the unmanned aerial vehicle can be conveniently and quickly supervised.

In an implementation scenario (denoted as an implementation scenario 3) of this embodiment of this application, during specific implementation, step 500 may include: The USS sends the fourth request to an NEF. In this case, the NEF receives the fourth request from the USS, determines the second AMF based on the fourth request, and sends the fourth request to the second. AMF. During specific implementation, step 501 may include: The second AMF receives the fourth request from the NEF.

In the implementation scenario 3, during specific implementation, the step "the NEF determines the second AMF based on the fourth request" may be implemented in the following manner a or manner b.

Manner a: The NEF obtains, from a UDM, information about AMFs serving the first-type terminal, and determines the second AMF based on the obtained information about the AMFs.

During specific implementation, the manner a may include: The NEF sends a seventh request to the UDM based on the fourth request, where the seventh request is used to request the AMFs serving the first-type terminal, and the seventh request includes the information used to indicate the first type; the UDM receives the seventh request from the NEF, determines, based on the seventh request, the AMFs serving the first-type terminal, and sends a response to the seventh request to the NEF, where the response to the seventh request includes fifth indication information, and the fifth indication information is used to indicate the AMFs serving the first-type terminal; and the NEF receives the response to the seventh request from the UDM, determines, based on the fifth indication information in the response to the seventh request, the AMF's serving the first-type terminal, and further determines the second AMF. The second AMF may be any AMF in the AMF's serving the first-type terminal.

The fifth indication information may be identifiers of the AMFs serving the first-type terminal. The identifiers of the AMFs may be names of the AMFs, addresses of the AMFs, or the like.

Optionally, the seventh request further includes sixth indication information, and the sixth indication information is used to indicate that a type of a requested network function is a mobility management function.

The UDM stores subscription information of a terminal, and the subscription information of the terminal includes device type information of the terminal or unmanned aerial vehicle subscription information (that is, information indicating whether the terminal subscribes to an unmanned aerial vehicle service, where this case is applicable to a scenario in which the first-type terminal is an unmanned aerial vehicle). The UDM may determine, based on the information used to indicate the first type, the device type information of the terminal or the unmanned aerial vehicle subscription information, and the information about the AMFs serving the terminal, the AMFs serving the first-type terminal, and send, to the NEF, the information about the AMFs serving the first-type terminal. The NEF determines the second AMF in the AMFs serving the first-type terminal.

Manner b: The NEF determines the second AMF based on information reported by AMFs.

During specific implementation of the manner b, the NEF may subscribe to a service event of the first-type terminal from the AMFs. In this case, when the AMFs serve the first-type terminal, the AMFs may report information about the AMFs to the NEF, so that the NEF determines the AMFs serving the first-type terminal, and determines the second AMF in the AMFs serving the first-type terminal. The second AMF may be any AMF in the AMFs serving the first-type terminal.

In another implementation scenario (denoted as an implementation scenario 4) of this embodiment of this application, during specific implementation, step 500 may include: The USS sends the fourth request to the second AMF. In this case, during specific implementation, step 501 may include: The second AMF receives the fourth request from the USS.

In the implementation scenario 4, before step 500, the method may further include: The USS determines the second AMF. During specific implementation of the step "the USS determines the second AMF", the USS is similar to the NEF, and may also determine the second AMF in the foregoing manner a or manner b. A difference lies only in that the USS determines the second AMF herein. In addition, the USS may further obtain information about the second AMF from the NEF. The NEF may determine the second AMF in the foregoing manner a or manner b.

Optionally, the fourth request includes area information of a second area, the area information is used to indicate the second area, and the fourth request is specifically used to request to position the first-type terminal in the second area.

The second area may be one or more cells. The cell in the second area may be air aerial cell, a normal cell, or a combination thereof. In this case, the area information of the second area may be identification information of the cell. Alternatively, the second area may be a TA. In this case, the area information of the second area may be identification information of the TA. Alternatively, the second area may be an area circled by a specific shape (for example, a polygon or a circle), or may be a three-dimensional area (for example, a no-fly zone of an unmanned aerial vehicle), an administrative area, or the like. In this case, the area information of the second area may be longitude and latitude information of the second area, description information of the three-dimensional area, or an identifier of the administrative region. For an unmanned aerial vehicle, the second area is generally a supervision area of the unmanned aerial vehicle, for example, an airport or an important activity site.

A service area of the second AMF at least partially overlaps the second area.

When the fourth request includes the area information of the second area, during specific implementation, step 502 includes: The second AMF positions the third terminal in the second area (which may be specifically an overlapping area of the service area of the second AMF and the second area) based on the fourth request. The third terminal is located in the second area, and is specifically located in the overlapping area of the service area of the second AMF and the second area.

When the fourth request includes the area information of the second area, during specific implementation, the step "the NEF determines the second AMF based on the fourth request" includes: The NEF determines the second AMF in the second area based on the fourth request. Specifically, the NEF may determine the second AMF in the second area in the following manner c or manner d.

Manner c: The NEF obtains, from a UDM, information about AMFs serving the first-type terminal, obtains, from an NRF, information about AMFs in the second area, and determines the second AMF based on the information about the AMFs serving the first-type terminal and the information about the AMFs in the second area.

During specific implementation of the manner c, the NEF may obtain, from the UDM in the manner a, the information about the AMFs serving the first-type terminal.

During specific implementation of the manner c, that the NEF obtains, from an NRF, information about AMFs in the second area may specifically include: The NEF sends an eighth request to the NRF based on the fourth request, where the eighth request is used to request the AMFs in the second area, and the eighth request includes the area information of the second area; the NRF receives the eighth request from the NEF, determines the AMFs in the second area based on the area information of the second area in the eighth request and a correspondence between an AMF and a service area of the AMF, and sends a response to the eighth request to the NEF, where the response to the eighth request includes seventh indication information, and the seventh indication information is used to indicate the information about the AMFs in the second area; and the NEF receives the response to the eighth request from the NRF, to obtain the information about the AMFs in the second area.

For example, when the area information of the second area is the identifier of the cell, if the area information of the second area is identifiers of a cell 1, a cell 2, and a cell 3, a service area of an AMF 1 includes the cell 1, and a service area of an AMF 2 includes the cell 2 and the cell 3, the AMFs in the second area are the AMF 1 and the AMF 2.

During specific implementation of the manner c, the NEF may determine, based on the information about the AMFs serving the first-type terminal (that is, the information indicated by the fifth indication information) and the information about the AMFs in the second area (that is, the information indicated by the seventh indication information), AMFs that are in the second area and that serve the first-type terminal, and determine the second AMF in the AMFs that are in the second area and that serve the first-type terminal, where the second AMF may be any AMF in the AMFs that are in the second area and that serve the first-type terminal.

Manner d: The NEF determines the second AMF based on information reported by AMFs.

During specific implementation of the manner d, the NEF may subscribe to a service event of the first-type terminal from AMFs in the second area. In this case, when the AMFs in the second area serve the first-type terminal, the AMFs in the second area may report information about the AMFs to the NEF, so that the NEF determines the AMFs that are in the second area and that serve the first-type terminal, and determines the second AMF in the AMFs that are in the second area and that serve the first-type terminal. The second AMF may be any AMF in the AMFs that are in the second area and that serve the first-type terminal.

In addition, when the fourth request includes the area information of the second area, in the implementation scenario 3, before step 501, the foregoing steps "the USS sends the fourth request to an NEF, and the NEF receives the fourth request from the USS, determines the second AMF based on the fourth request, and sends the fourth request to the second AMF" may be performed, or the following steps (11) to (13) may be performed.

(11) The USS sends a ninth request to the NEF, where the ninth request is used to request to identify the first-type terminal in a third area, and the ninth request may include area information of the third area and the information used to indicate the first type.

(12) The NEF determines the second area based on the third area, and determines the second AMF based on the second area and the information used to indicate the first type. The second area is a subset of the third area.

(13) The NEF sends the fourth request to the second ANTE

The third area may be one or more cells. The cell in the third area may be an aerial cell, a normal cell, or a combination thereof. In this case, the area information of the third area may be identification information of the cell. Alternatively, the third area may be a TA. In this case, the area information of the third area may be identification information of the TA. Alternatively, the third area may be an area circled by a specific shape (for example, a polygon or a circle), or may be a three-dimensional area (for example, a no-fly zone of an unmanned aerial vehicle), an administrative area, or the like. In this case, the area information of the third area may be longitude and latitude information of the third area, description information of the three-dimensional area, or an identifier of the administrative region. For an unmanned aerial vehicle, the third area is generally a supervision area of the unmanned aerial vehicle, for example, an airport or an important activity site.

The method for determining the second area by the NEF based on the third area may be designed based on an actual application scenario. For example, if the third area is the no-fly zone of the unmanned aerial vehicle, the NEF may determine an area that is in the no-fly zone and that is covered by each AMF serving the first-type terminal, and the NEF may determine the second area as an area that is in the no-fly zone and that is covered by a specific AMF serving the first-type terminal, and determine that the specific AMF is the second AMF. For another example, if the third area is a plurality of cells, the NEF may determine that an area that is in the plurality of cells and that is covered by a same AMF serving the first-type terminal is the second area, and determine that the same AMF is the second AMF.

In the foregoing embodiment, all messages sent by the AMF (for example, the first AMF and the second AMF) to the USS may be forwarded by the NEF. When a message (for example, the response to the first request or the response to the fourth request) sent by the AMF to the USS includes the identifier of the terminal, because an EMSI is an internal identifier of a 3GPP network, if the identifier of the terminal is the EMSI, the NEF may replace the EMSI in the message sent by the AMF with an external identifier (for example, an IMEI, an IP address, or a URL) of the 3GPP network. In this way, the USS can successfully identify the terminal.

In the foregoing embodiments, message exchange and information exchange between network elements may be alternatively implemented by using a service-oriented API. A message can be considered as a service and implemented by one or more APIs. Alternatively, a message can be considered as an API, and interaction information can be used as an input parameter or an output result of the API. The following describes information exchange between the USS and the NEF as an example. The NEF may provide a first-type terminal identification service. The service is implemented by using an API X, and is used to indicate that information of the first type may be used as an input parameter of the API X. In this case, that the USS sends the information used to indicate the first type to the NEF may be understood as that the USS invokes the API X provided by the NEF. The NEF may further provide a first-type terminal positioning service. The service is implemented by using an API Y, and the information used to indicate the first type, the positioning precision, and the location reporting periodicity may be used as input parameters of the API Y In this case, that the USS sends, to the NEF, the information used to indicate the first type, the positioning precision, and the location reporting periodicity can be considered as: The USS invokes the API Y provided by the NEF. In addition, alternatively, no parameter may be input to the API X or the API Y. This depends on an API provision manner.

In the foregoing embodiments, the first AMF or the second AMF may position the terminal only once, or may position the terminal for a plurality of times (for example, periodically position the terminal). This is not specifically limited in the embodiments of this application.

To make the methods provided in the embodiments of this application clearer, the following describes an example of an implementation procedure of the foregoing methods by using Embodiment 1 and Embodiment 2. In Embodiment 1 and Embodiment 2, the foregoing embodiments are described by using an example in which the first-type terminal is an unmanned aerial vehicle.

Embodiment 1

Figure 6:
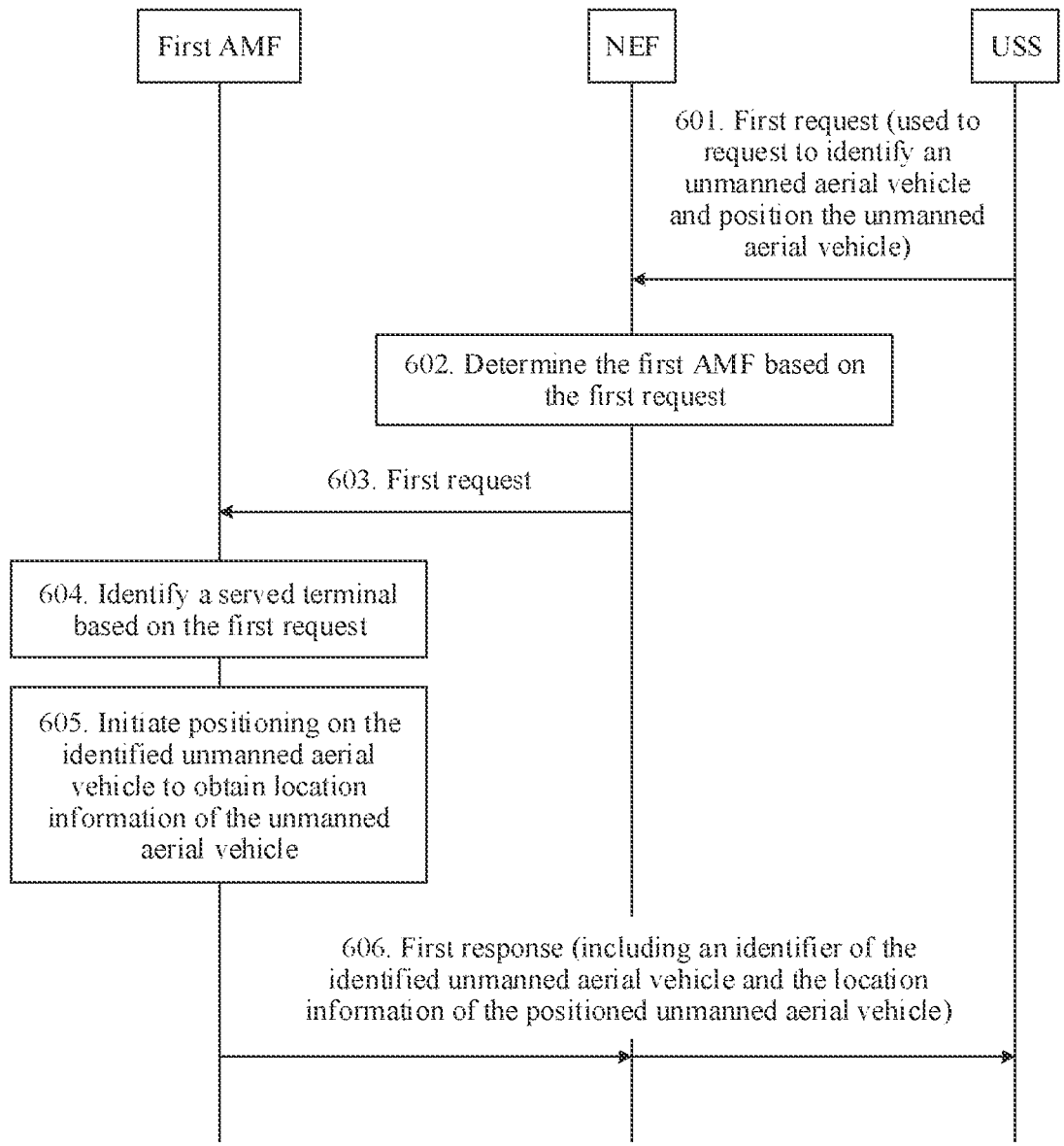
FIG. 6 and FIG. 7 are interaction flowcharts of terminal identification and positioning methods according to an embodiment of this application.

In Embodiment 1, a first request is used to request to identify an unmanned aerial vehicle and position the unmanned aerial vehicle. As shown in FIG. 6, the method includes the following steps.

601. A USS sends the first request to an NEF. Correspondingly, the NEF receives the first request from the USS.

A first AMF is an AMF serving the unmanned aerial vehicle. The first message may include information used to indicate the unmanned aerial vehicle.

602. The NEF determines the first AMF based on the first request.

Step 602 may be specifically implemented in the foregoing manner 1 or manner 2.

603. The NEF sends the first request to the first AMF. Correspondingly, the first AMF receives the first request from the NEF.

604. The first AMF identifies, based on the first request, a terminal served by the first AMF.

Step 604 may be specifically implemented in any one of the foregoing manners (1) to (3).

605. The first AMF initiates positioning on the identified unmanned aerial vehicle, and obtains location information of the unmanned aerial vehicle.

606. The first AMF sends a first response to the USS, where the first response includes an identifier of the identified unmanned aerial vehicle and the location information of the positioned unmanned aerial vehicle.

Embodiment 2

Figure 7:
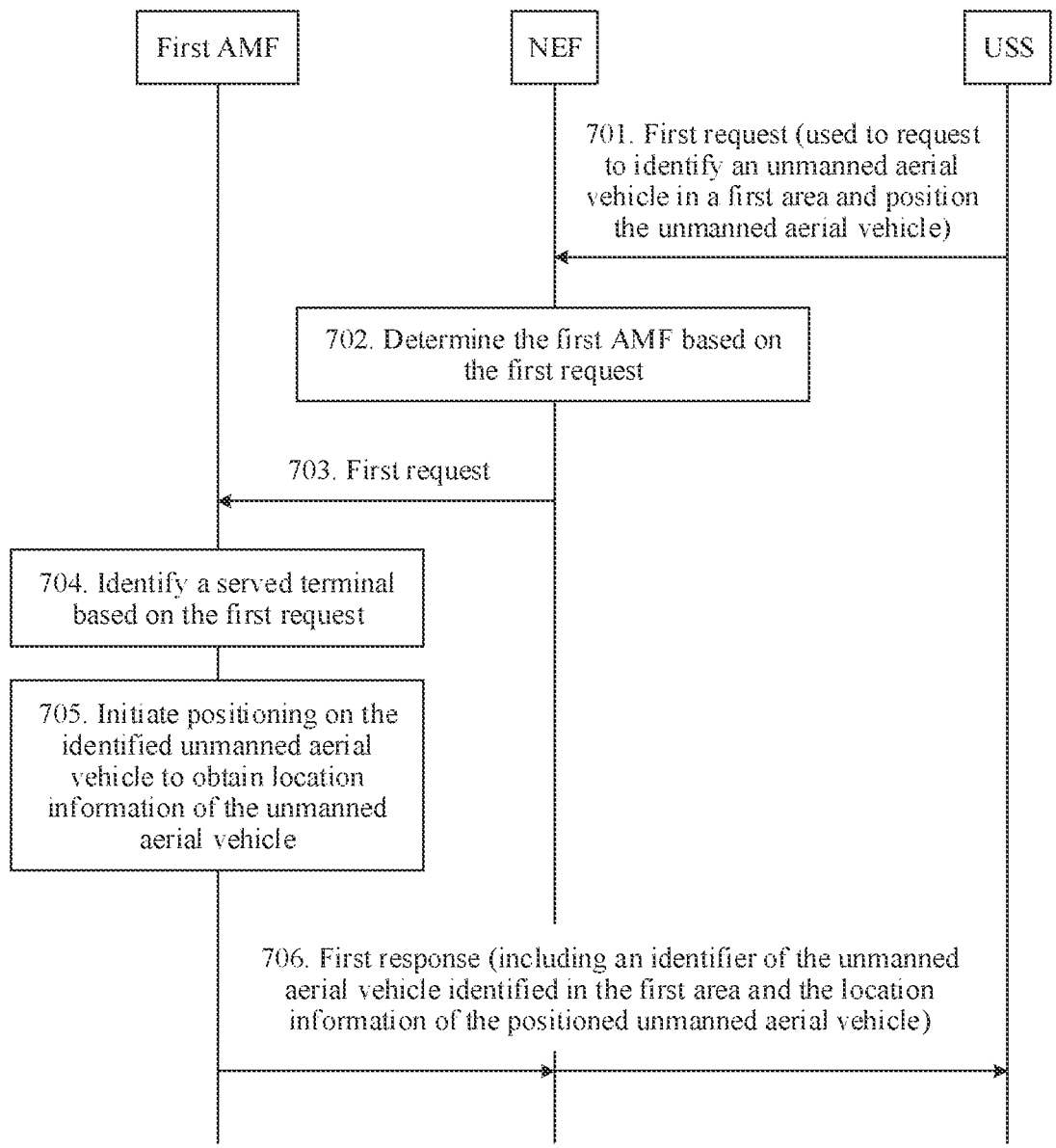

In Embodiment 2, a first request is used to request to identify an unmanned aerial vehicle in a first area and position the unmanned aerial vehicle. As shown in FIG. 7, the method includes the following steps.

701. A USS sends the first request to an NEF. Correspondingly, the NEF receives the first request from the USS.

A first AMF is an AMF serving the unmanned aerial vehicle in the first area.

702. The NEF determines the first AMF based on the first request.

Step 702 may be specifically implemented in the foregoing manner 3 or manner 4.

703. The NEF sends the first request to the first AMF. Correspondingly, the first AMF receives the first request from the NEF.

704. The first AMF identifies the terminal in the first area based on the first request.

Step 704 may be specifically implemented in any one of the foregoing manners (1) to (3).

705. The first AMF initiates positioning on the identified unmanned aerial vehicle, and obtains location information of the unmanned aerial vehicle.

706. The first AMF sends a first response to the USS, where the first response includes an identifier of the unmanned aerial vehicle identified in the first area and the location information of the positioned unmanned aerial vehicle.

Figure 8:
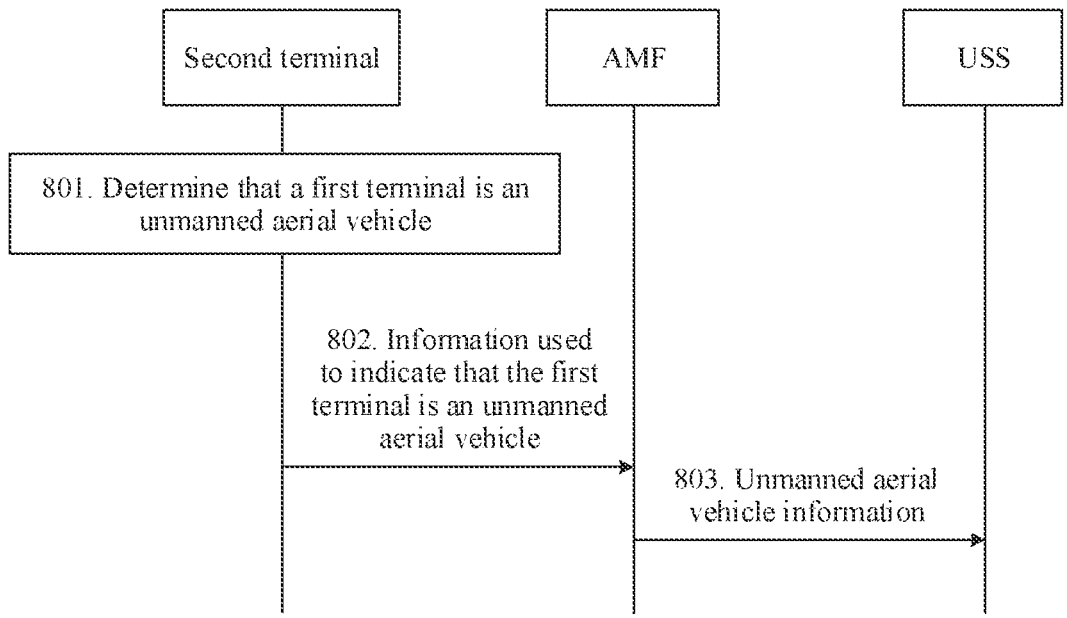
FIG. 8 is an interaction flowchart of a terminal positioning method according to an embodiment of this application.

In addition, an embodiment of this application further provides an unmanned aerial vehicle identification method. In the method, a first terminal and a second terminal are performing device to device (device to device, D2D for short) communication (for example, relay discovery), and the second terminal may communicate with an AMF. As shown in FIG. 8, the method includes the following steps.

801. The second terminal determines that the first terminal is an unmanned aerial vehicle.

During specific implementation of step 801, the second terminal may determine, based on a device type, a device capability, or a device identifier of the first terminal in a communication process, that the first terminal is an unmanned aerial vehicle.

802. The second terminal reports, to an AMF, information used to indicate that the first terminal is an unmanned aerial vehicle.

The information used to indicate that the first terminal is an unmanned aerial vehicle may include the identifier of the first terminal and the device type information of the first terminal.

Optionally, the second terminal may further report location information of the first terminal, and the location information of the first terminal may be obtained by the second terminal in the communication process with the first terminal.

803. The AMF reports unmanned aerial vehicle information to a USS.

The unmanned aerial vehicle information may include the identifier of the first terminal, and may further include the location information of the first terminal. Optionally, the unmanned aerial vehicle information further includes the device type information of the first terminal.

During specific implementation of step 803, the AMF may report the unmanned aerial vehicle information to the USS by using an NEF.

The first terminal and the second terminal in the embodiment shown in FIG. 8 have no direct relationship with the first terminal and the second terminal in the foregoing other embodiments.

According to the method provided in this embodiment of this application, another unmanned aerial vehicle identification method is provided. In D2D communication, a terminal can identify an unmanned aerial vehicle, and report unmanned aerial vehicle information to the USS by using the AMF, so that the USS can conveniently and quickly supervise the unmanned aerial vehicle.

The foregoing mainly describes the solutions in the embodiments of this application from a perspective of interaction between network elements. It may be understood that, to implement the foregoing functions, each network element, for example, a mobility management entity or an application server, includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In the embodiments of this application, the mobility management entity or the application server may be divided into functional units based on the foregoing method examples. For example, each functional unit may be obtained through division for each function, or two or more functions may be integrated into one processing unit. The integrated unit may be implemented in a form of hardware, or may be implemented in a form of a software functional unit. It should be noted that, in the embodiments of this application, unit division is an example, and is merely logical function division. In actual implementation, another division manner may be used.

Figure 9:
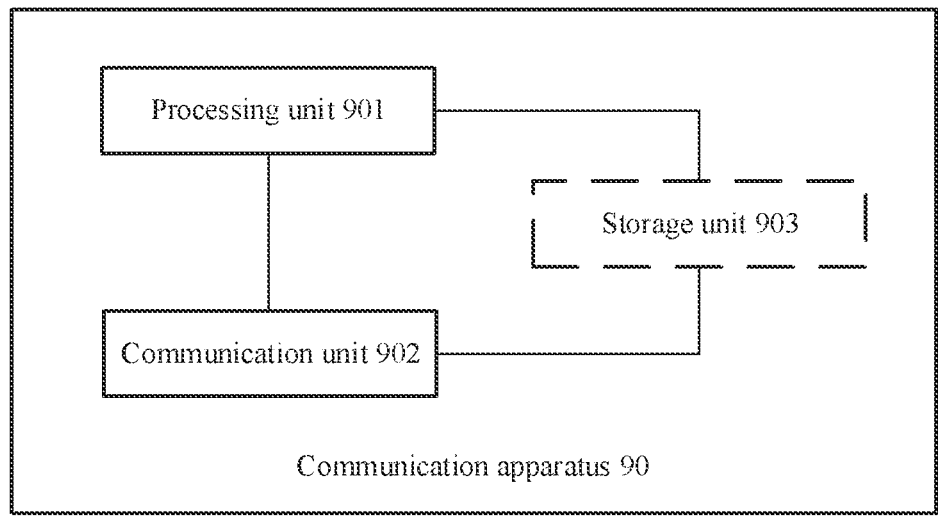
FIG. 9 is a schematic composition diagram of a communication apparatus according to an embodiment of this application.

When an integrated unit is used. FIG. 9 is a possible schematic structural diagram of the communication apparatus in the foregoing embodiments. The communication apparatus includes a processing unit 901 and a communication unit 902 (which may also be referred to as a transceiver unit 902). Optionally, the communication apparatus further includes a storage unit 903. A schematic structural diagram shown in FIG. 9 may be used to illustrate a structure of the mobility management entity (for example, the first AMF in FIG. 4, FIG. 6, or FIG. 7, or the second AMF in FIG. 5) or the application server (for example, the USS in any one of the accompanying drawings FIG. 4 to FIG. 7) in the foregoing embodiments.

When the schematic structural diagram shown in FIG. 9 is used to show the structure of the mobility management entity in the foregoing embodiments, in a possible implementation:

the communication unit 902 is configured to receive a first request, where the first request is used to request to identify a first-type terminal; and the processing unit 901 is configured to send a response to the first request to an application server by using the communication unit 902 based on the first request, where the response to the first request is used to indicate that the first-type terminal is identified.

Optionally, the response to the first request includes an identifier of a first terminal and/or first indication information, a type of the first terminal is the first type, and the first indication information is used to indicate that the first-type terminal is identified.

Optionally, the first request includes area information of a first area, the area information is used to indicate the first area, and the first request is specifically used to request to identify the first-type terminal in the first area; and the first terminal is located in the first area, or the first indication information is specifically used to indicate that the first-type terminal is identified in the first area.

Optionally, the response to the first request includes the first indication information, and the communication unit 902 is further configured to receive a second request, where the second request is used to request to position the identified first-type terminal; and the processing unit 901 is further configured to send a response to the second request to the application server by using the communication unit 902 based on the second request, where the response to the second request includes an identifier of a second terminal and location information of the second terminal, and a type of the second terminal is the first type.

Optionally, when the first request includes the area information of the first area, the second request includes the area information of the first area, the second request is specifically used to request to position the first-type terminal identified in the first area, and the second terminal is located in the first area.

Optionally, the response to the first request includes the identifier of the first terminal and location information of the first terminal, and the processing unit 901 is further configured to position the identified first-type terminal based on the first request.

Optionally, the response to the first request includes the identifier of the first terminal, and the communication unit 902 is further configured to receive a third request, where the third request is used to request to position the first terminal; and the processing unit 901 is further configured to send a response to the third request to the application server by using the communication unit 902 based on the third request, where the response to the third request includes location information of the first terminal.

When the schematic structural diagram shown in FIG. 9 is used to show the structure of the application server in the foregoing embodiments, in a possible implementation:

the processing unit 901 is configured to send a first request by using the communication unit 902, where the first request is used to request to identify a first-type terminal; and the processing unit 901 is further configured to receive a response to the first request by using the communication unit 902, where the response to the first request is used to indicate that the first-type terminal is identified.

Optionally, the response to the first request includes an identifier of a first terminal and/or first indication information, a type of the first terminal is the first type, and the first indication information is used to indicate that the first-type terminal is identified.

Optionally, the first request includes area information of a first area, the area information is used to indicate the first area, and the first request is specifically used to request to identify the first-type terminal in the first area; and the first indication information is specifically, used to indicate that the first-type terminal is identified in the first area, or that the first terminal is located in the first area.

Optionally, the response to the first request includes the first indication information, and the processing unit 901 is further configured to send a second request by using the communication unit 902 based on the response to the first request, where the second request is used to request to position the identified first-type terminal; and the processing unit 901 is further configured to receive a response to the second request by using the communication unit 902, where the response to the second request includes an identifier of a second terminal and location information of the second terminal, and a type of the second terminal is the first type.

Optionally, when the first request includes the area information of the first area, the second request includes the area information of the first area, the second request is specifically used to request to position the first-type terminal identified in the first area, and the second terminal is located in the first area.

Optionally, the response to the first request includes the identifier of the first terminal and location information of the first terminal.

Optionally, the response to the first request includes the identifier of the first terminal, and the processing unit 901 is further configured to send a third request by using the communication unit 902 based on the response to the first request, where the third request is used to request to position the first terminal; and the processing unit 901 is further configured to receive a response to the third request by using the communication unit 902, where the response to the third request includes location information of the first terminal.

The processing unit 901 may be a processor or a controller. The communication unit 902 may be a communication interface, a transceiver, a transceiver circuit, or the like, where the communication interface is a general term, and may include one or more interfaces. The storage unit 903 may be a memory.

Figure 10:
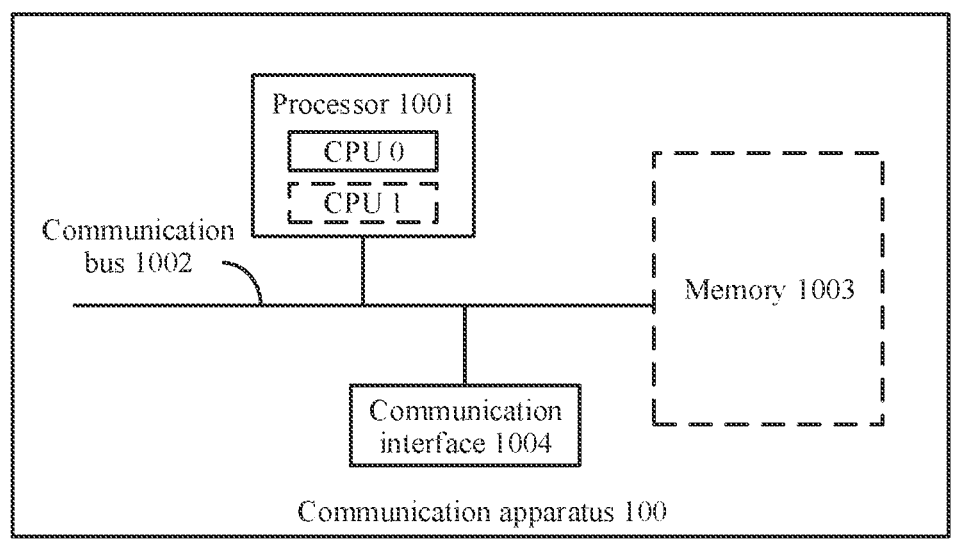
FIG. 10 is a schematic diagram of a hardware structure of a communication apparatus according to an embodiment of this application.

When the processing unit 901 is a processor, the communication unit 902 is a communication interface, and the storage unit 903 is a memory, the communication apparatus in this embodiment of this application may be a communication apparatus shown in FIG. 10.

FIG. 10 is a schematic diagram of a hardware structure of a communication apparatus according to an embodiment of this application. The communication apparatus may be the mobility management entity or the application server in this specification. The communication apparatus 100 includes at least one processor 1001, a communication bus 1002, and at least one communication interface 1004. Optionally, the communication apparatus further includes a memory 1003. FIG. 10 is drawn by using an example in which the communication apparatus 100 includes one processor 1001 and one communication interface 1004.

The processor 1001, the communication interface 1002, and the memory 1003 may be connected by using a communication bus to implement mutual communication and transfer a control signal and/or a data signal. The memory 1003 is configured to store a computer program. The processor 1001 is configured to invoke the computer program from the memory 1003 and run the computer program, to control the communication interface 1002 to receive and send a signal.

In a first possible implementation, the processor 1001 may be a general-purpose central processing unit (CPU for short), a microprocessor, an application-specific integrated circuit (ASIC for short), or one or more integrated circuits configured to control program execution of the solutions in this application. The communication interface 1002 may be any apparatus such as a transceiver.

In a second possible implementation, the processor 1001 may be a logic circuit, and the communication interface 1002 may include an input interface and an output interface.

The communication interface 1004 is configured to communicate with another device or communication network by using any apparatus such as a transceiver.

The memory 1003 may be a read-only memory (ROM for short) or another type of static storage device that can store static information and instructions, or a random access memory (RAM for short) or another type of dynamic storage device that can store information and instructions, or may be an electrically erasable programmable read-only memory (EEPROM for short), a compact disc read-only memory (CD-ROM for short) or other compact disc storage, optical disc storage (including a compact disc, a laser disc, an optical disc, a digital versatile disc, a Blu-ray disc, or the like), a disk storage medium or another magnetic storage device, or any other medium that can be configured to carry or store expected program code having instructions or a data structure form and that can be accessed by a computer. However, this is not limited thereto. The memory may exist independently and is connected to the processor by using the communication bus 1002. Alternatively, the memory may be integrated with the processor.

The memory 1003 is configured to store computer-executable instructions for executing the solutions of this application, and the processor 1001 controls the execution. The processor 1001 is configured to execute the computer-executable instructions stored in the memory 1003, to implement the methods provided in the foregoing embodiments of this application.

Optionally, the computer-executable instructions in the embodiments of this application may also be referred to as application program code. This is not specifically limited in the embodiments of this application.

When the schematic structural diagram shown in FIG. 10 is used to illustrate a structure of the mobility management entity (for example, the first AMF in FIG. 4, FIG. 6, or FIG. 7, or the second AMF in FIG. 5) in the foregoing embodiments, the processor 1001 is configured to control and manage an action of the mobility management entity. For example, the processor 1001 is configured to support the mobility management entity in performing step 402 and step 403 in FIG. 4 (in this case, the mobility management entity is the first AMF in FIG. 4), step 501 to step 503 in FIG. 5 (in this case, the mobility management entity is the second AMF in FIG. 5), step 603 to step 606 in FIG. 6 (in this case, the mobility management entity is the first AMF in FIG. 6), step 703 to step 706 in FIG. 7 (in this case, the mobility management entity is the first AMF in FIG. 7), and/or an action performed by the mobility management entity in another process described in the embodiments of this application. The communication interface 1004 is configured to support the mobility management entity in communicating with another network entity, for example, communicating with the USS shown in FIG. 4. The memory 1003 is configured to store program code and data of the mobility management entity.

When the schematic structural diagram shown in FIG. 10 is used to illustrate the structure of the application server (for example, the USS in any one of the accompanying drawings FIG. 4 to FIG. 7) in the foregoing embodiments, the processor 1001 is configured to control and manage an action of the application server. For example, the processor 1001 is configured to support the application server in performing step 401 and step 403 in FIG. 4 (in this case, the application server is the USS in FIG. 4), step 500 and step 503 in FIG. 5 (in this case, the application server is the LISS in FIG. 5), step 601 and step 606 in FIG. 6 (in this case, the application server is the USS in FIG. 6), step 701 and step 706 in FIG. 7 (in this case, the application server is the USS in FIG. 7), and/or an action performed by the application server in another process described in the embodiments of this application. The communication interface 1004 is configured to support the application server in communicating with another network entity, for example, communicating with the first AMF shown in FIG. 4. The memory 1003 is configured to store program code and data of the application server.

An embodiment of this application further provides a computer-readable storage medium including instructions. When the computer-readable storage medium runs on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system. The communication system includes the mobility management entity and the application server in the foregoing embodiments. Optionally, the communication system further includes a border control network element.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD for short)), or the like.

Although this application is described with reference to the embodiments, in a process of implementing this application that claims protection, a person skilled in the art may understand and implement another variation of the disclosed embodiments by viewing the appended drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A terminal identification method, comprising:
receiving, by a first mobility management entity, a first request, wherein the first request comprises area information of a first area and information used to indicate a first type, the first type is an unmanned aerial vehicle, the area information is used to indicate the first area, and the first request is a request for identifying a first-type terminal in the first area; and
sending, by the first mobility management entity to a network exposure function, a first response to the first request based on the first request, wherein the first response indicates that the first-type terminal is identified in the first area, the first response comprises an identifier of a first terminal, the identified first-type terminal comprises the first terminal, and the first terminal is located in the first area.

2. The method according to claim 1, further comprising:
determining, by the first mobility management entity based on unmanned aerial vehicle subscription information of the first terminal, whether the first terminal is the first-type terminal.

3. The method according to claim 2, wherein the first terminal includes one or more terminals.

4. The method according to claim 2, wherein receiving, by the first mobility management entity, the first request comprises:
receiving, by the first mobility management entity, the first request from the network exposure function.

5. The method according to claim 4, wherein the first mobility management entity is a mobility management entity whose service area at least partially overlaps the first area.

6. The method according to claim 1, wherein receiving, by the first mobility management entity, the first request comprises:
receiving, by the first mobility management entity, the first request from the network exposure function.

7. The method according to claim 1, wherein the first mobility management entity is a mobility management entity whose service area at least partially overlaps the first area.

8. A communication apparatus, comprising a memory and at least one processor, wherein the memory stores computer-executable instructions, and the at least one processor executes the computer-executable instructions stored in the memory to enable the communication apparatus to perform operations comprising:
receiving a first request, wherein the first request comprises area information of a first area and information used to indicate a first type, the first type is an unmanned aerial vehicle, the area information is used to indicate the first area, and the first request is a request for identifying a first-type terminal in the first area; and
sending, to a network exposure function, a first response to the first request based on the first request, wherein the first response indicates that the first-type terminal is identified in the first area, the first response comprises an identifier of a first terminal, the identified first-type terminal comprises the first terminal, and the first terminal is located in the first area.

9. The apparatus according to claim 8, wherein the operations further comprise:
determining, based on unmanned aerial vehicle subscription information of the first terminal, whether the first terminal is the first-type terminal.

10. The apparatus according to claim 9, wherein the first terminal includes one or more terminals.

11. The apparatus according to claim 9, wherein receiving the first request comprises:
receiving the first request from the network exposure function.

12. The apparatus according to claim 11, wherein the apparatus is a mobility management entity whose service area at least partially overlaps in the first area.

13. The apparatus according to claim 8, wherein the first request is received from the network exposure function.

14. The apparatus according to claim 8, wherein the apparatus is a mobility management entity whose service area at least partially overlaps the first area.

15. A communication system, comprising a network exposure function and a first mobility management entity, wherein the network exposure function is configured to:
send a first request to the first mobility management entity, wherein the first request comprises area information of a first area and information used to indicate a first type, the first type is an unmanned aerial vehicle, the area information is used to indicate the first area, and the first request is a request for identifying a first-type terminal in the first area; and
the first mobility management entity is configured to:
receive the first request; and
send, to the network exposure function, a first response to the first request based on the first request, wherein the first response indicates that the first-type terminal is identified in the first area, the first response comprises an identifier of a first terminal, the identified first-type terminal comprises the first terminal, and the first terminal is located in the first area; and
the network exposure function is further configured to:
receive the first response.

16. The system according to claim 15, wherein the first mobility management entity is further configured to determine, based on unmanned aerial vehicle subscription information of the first terminal, whether the first terminal is the first-type terminal.

17. The system according to claim 16, wherein the first terminal includes one or more terminals.

18. The system according to claim 16, wherein the first mobility management entity receives the first request from the network exposure function.

19. The system according to claim 18, wherein the first mobility management entity is a mobility management entity whose service area at least partially overlaps the first area.

20. The system according to claim 15, wherein the first mobility management entity receives the first request from the network exposure function.

* * * * *